United States Patent
Sprague

(10) Patent No.: US 12,425,063 B2
(45) Date of Patent: Sep. 23, 2025

(54) HAND-OPERATED EARPIECE FOR MOBILE PHONES

(71) Applicant: Gary Sprague, Exeter, CA (US)

(72) Inventor: Gary Sprague, Exeter, CA (US)

( * ) Notice: Subject to any disclaimer, the term of this patent is extended or adjusted under 35 U.S.C. 154(b) by 325 days.

(21) Appl. No.: 18/162,046

(22) Filed: Jan. 31, 2023

(65) Prior Publication Data

US 2024/0259041 A1    Aug. 1, 2024

(51) Int. Cl.
  *H04R 1/10* (2006.01)
  *H04B 1/3827* (2015.01)
  *H04R 1/08* (2006.01)

(52) U.S. Cl.
  CPC ............ *H04B 1/385* (2013.01); *H04R 1/083* (2013.01); *H04R 1/1016* (2013.01); *H04R 1/1025* (2013.01); *H04R 2420/07* (2013.01)

(58) Field of Classification Search
  CPC ...... H04B 1/385; H04R 1/083; H04R 1/1016; H04R 1/1025
  See application file for complete search history.

(56) References Cited

U.S. PATENT DOCUMENTS

| | | | |
|---|---|---|---|
| 7,311,526 B2 | 12/2007 | Rohrbach et al. | |
| 10,892,625 B1* | 1/2021 | Franklin | A45C 11/00 |
| 11,106,782 B2 | 8/2021 | Hofer | |
| 11,803,348 B1* | 10/2023 | Puskarich | G06F 3/165 |
| 2002/0027777 A1* | 3/2002 | Takasu | F21V 21/084 |
| | | | 362/800 |
| 2015/0245127 A1* | 8/2015 | Shaffer | H04R 1/1025 |
| | | | 381/380 |
| 2017/0064433 A1* | 3/2017 | Hirsch | H04R 1/028 |
| 2017/0245040 A1* | 8/2017 | Hankey | H04M 1/6066 |
| 2018/0077481 A1* | 3/2018 | Kim | H04R 1/105 |
| 2018/0139531 A1* | 5/2018 | Christiansen | H04R 25/656 |
| 2021/0306748 A1* | 9/2021 | Vargas | H04R 1/1066 |
| 2023/0269514 A1* | 8/2023 | Cousins | H04R 1/1025 |
| | | | 381/74 |
| 2024/0073576 A1* | 2/2024 | Luo | H04R 1/1016 |

OTHER PUBLICATIONS

"Ear canal", Wikipedia, retrieved Jan. 5, 2023 from https://en.wikipedia.org/wiki/Ear_canal.

(Continued)

*Primary Examiner* — Simon King
(74) *Attorney, Agent, or Firm* — John M. Rogitz; John L. Rogitz

(57) ABSTRACT

In one aspect, an earphone for use with a mobile phone or other device may include a low-profile, ergonomic head with a speaker and a flat front surface. The front surface may be be bounded by three sides and a curved bottom edge that is configured for placement on top of an incisura of an ear to hang on the incisura, thereby improving user comfort. Additionally, a trigger related to the earphone may be used so that, responsive to identifying the trigger, the mobile phone may facilitate a call and present mono audio from the call via the at least one speaker on the earphone. In certain examples, the trigger may include a threshold period of time elapsing from detachment of the earphone from the mobile device during call reception.

15 Claims, 18 Drawing Sheets

(56) References Cited

OTHER PUBLICATIONS

"How to Sense Current in a Battery Management System", Learning About Electronics, 2018. retrieved Jan. 23, 2023 from http://www.learningaboutelectronics.com/Articles/How-to-sense-current-in-a-battery-management-system.php#:~:text=The%20other%20most%20common%20way,secondary%20current%20in%20the%20coil.

"HVBMS Battery Management Unit (BMU)", NXP Semiconductors, NXP.com, retrieved Jan. 23, 2023 from https://www.nxp.com/design/development-boards/analog-toolbox/high-voltage-battery-management-system-hvbms/hvbms-battery-management-unit-bmu:HVBMS-BMU.

"Infineon Sealed Dual-Membrane (SDM) MEMS in Goertek Microphone", Mar. 2020, Yole Group, retrieved Jan. 3, 2023 from https://www.yolegroup.com/product/report/infineon-sealed-dual-membrane-sdm-mems-in-goertek-microphone/.

"Loudspeaker enclosure", Wikipedia, retrieved from https://en.wikipedia.org/wiki/Loudspeaker_enclosure on Jan. 10, 2023.

"Power Management Guide", STMicroelectronics, Nov. 2022.

"Voice Frequency", Wikipedia, retrieved on Jan. 3, 2023 from https://en.wikipedia.org/wiki/Voice_frequency.

"Wideband Audio", Wikipedia, retrieved on Jan. 3, 2023 from https://en.wikipedia.org/wiki/Wideband_audio.

"Wideband", Wikipedia, retrieved on Jan. 3, 2023 from https://en.wikipedia.org/wiki/Wideband.

Average_Joe, "Earphone Fit Guide", May 16, 2013, retrieved Jan. 9, 2023 from https://theheadphonelist.com/earphone-fit-guide/#google_vignette.

Elliott, Rod, "Loudspeaker Enclosure Design Guidelines", Dec. 2022, Elliott Sound Products, retrieved Jan. 10, 2023 from https://sound-au.com/articles/enclosures.htm.

Harrison, Andrew, "How to make and receive HD phone calls", Jul. 18, 2014, TechAdvisor.

Motley, Josiah, "Which Apple Airpod contains the microphone", Jul. 22, 2019, retrieved Jan. 3, 2023 from https://knowtechie.com/which-apple-airpod-contains-the-microphone/.

Voss, Susan & Horton, Nicholas & Fairbank, Katherine & Xia, Lu & Tinglin, Lauren & Girardin, Kathryn. (2020). Measurements of ear-canal cross-sectional areas from live human ears with implications for wideband acoustic immittance measurements. The Journal of the Acoustical Society of America. 148. 3042-3051. 10.1121/10.0002358.

\* cited by examiner

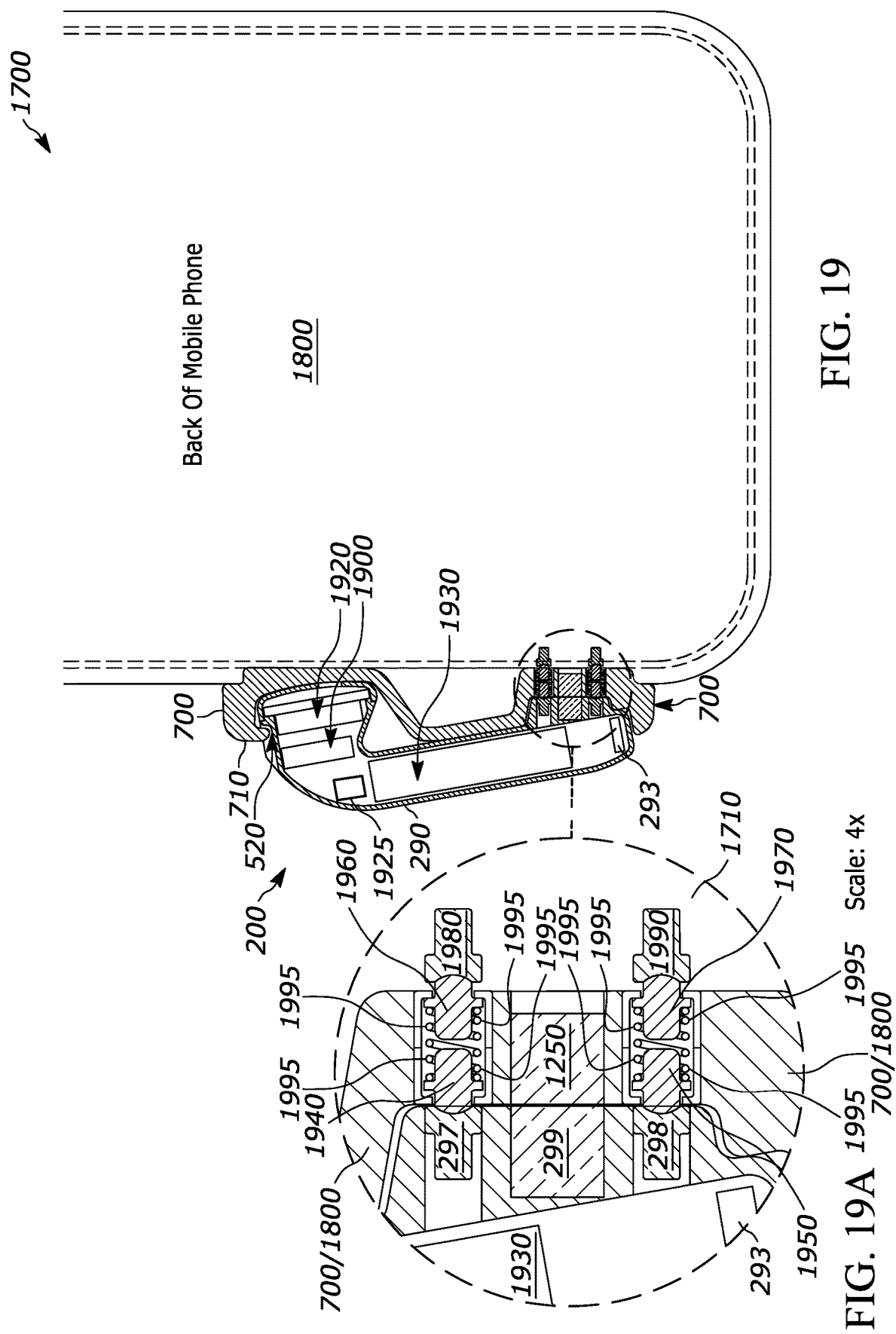

ND-OPERATED EARPIECE FOR MOBILE PHONES

FIELD

The disclosure below relates to technically inventive, non-routine solutions that are necessarily rooted in computer technology and that produce concrete technical improvements. In particular, the disclosure below relates to hand-operated earpieces for mobile phones and other types of electronic devices.

BACKGROUND

Mobile phones have been integrated into our lives in a variety of ways due to their computational, photographic, sound playback/recording, video capture, wireless, GPS, and visual display hardware. Also, the creation of numerous software applications that interface with these types of hardware make for an even greater user experience.

However, as recognized herein, certain handsfree talk modes and face-to-face video calls have limitations when used in public spaces, or anytime privacy is desired, due to the projection of sound from the incoming/remote caller as played aloud locally. As also recognized herein, when holding the phone up to one's ear, the incoming call portion of the conversation might be more private, which might be particularly desirable given the user does not have control over what is said by the person on the other end of the line, but holding the phone to one's ear for the duration of the call is not always optimal and might even be illegal like when driving a vehicle in certain jurisdictions. As even further recognized herein, while left/right stereo earbuds and other headset devices may be used with the phone, these devices can be inconvenient to carry around separately from the phone and, for many users, can result in great discomfort over time from wearing them. Another issue recognized herein is that regardless of whether the phone is held to one's ear, or if earbuds or other headset devices are used, the phone's touch display screen oftentimes still needs to be used to answer or initiate the phone call itself.

SUMMARY

The disclosure below therefore recognizes a need for a better way to interface with mobile phones and maintain the privacy of audible electronic communications. Accordingly, disclosed herein are hand-operated, ear-insertable devices that can attach to the phone when not in use, have direct control over the answering, initiation, and ending of calls, and provide improved comfort when worn in the ear as well as improved speed of insertion.

Thus, in one aspect an earphone assembly for a mobile phone includes an earphone. The earphone includes a head configured for engaging an ear, with the head including at least one speaker. The head also includes a flat front surface facing toward an ear canal when worn, with the flat front surface being bounded by three straight sides and a curved bottom edge. The earphone also includes an elongated stem. The stem includes a first end engaged with a rear portion of the head opposite the flat front surface, and a second end opposite the first end. The stem depends down from the head when worn, and at least one microphone is disposed on the stem adjacent the second end. The stem is graspable with thumb, fore, and middle fingers for ergonomic gripping.

If desired, in some examples the earphone assembly may also include at least one magnet adjacent the second end to magnetically couple to the mobile phone. The earphone assembly may further include at least one electrical connector adjacent the second end to electrically engage the mobile phone.

Still further, in certain examples the earphone assembly may include the mobile phone itself. The mobile phone may be programmed with instructions to, responsive to a trigger, answer an incoming call and wirelessly communicate with the earphone to present audio from the incoming call via the at least one speaker. The trigger may include a threshold period of time elapsing from detachment of the earphone from the mobile phone during call reception. Additionally or alternatively, the trigger may include receipt of one or more wireless signals from the earphone that indicate that the earphone has been engaged with the ear. So, for example, the earphone may include a touch sensor and the one or more wireless signals may be generated based input from the touch sensor. Additionally or alternatively, the one or more wireless signals may be generated based on audible vocal input received at the at least one microphone. What's more, in various examples the instructions may even be executable to terminate a call responsive to mechanical or magnetic engagement of the earphone with the mobile phone.

Also in some example embodiments, the earphone assembly may include a housing for the mobile phone, where the housing may be configured to couple the earphone to the mobile phone. The housing may include an integral housing and/or a detachable mobile phone case. The detachable mobile phone case may be detachable by hand without the aid of a tool.

Additionally, in some example implementations the earphone may include a first wireless transceiver, where the first wireless transceiver may be configured to wirelessly communicate with a second wireless transceiver on the mobile phone to facilitate telephone calls.

In another aspect, a method includes identifying, at a device, a trigger related to an earphone that produces mono audio under control of the device. The method also includes, responsive to identifying the trigger, facilitating a call and wirelessly communicating with the earphone to present mono audio from the call via at least one speaker on the earphone.

If desired, in certain examples the method may include providing the device and the earphone, where the earphone itself may include a head configured for engaging an ear. The head may include the at least one speaker and a flat front surface facing toward an ear canal when worn. The flat front surface may be bounded by three straight sides and a curved bottom edge. The earphone may also include an elongated stem including a first end engaged with a rear portion of the head opposite the flat front surface and a second end opposite the first end. The stem may depend down from the head when worn, and at least one microphone may be disposed on the stem adjacent the second end. The stem may be graspable with thumb, fore, and middle fingers for ergonomic gripping.

In various example implementations, the trigger may include an audible command received via a microphone on the earphone, where the audible command may be to initiate the call. Additionally or alternatively, the trigger may include audible input indicating a vocal greeting, where the audible input may be received via the microphone on the earphone. As other examples in addition to or in lieu of the foregoing, the trigger may include a threshold period of time elapsing from detachment of the earphone from the device during call reception, and/or receipt of one or more wireless signals from the earphone that indicate that the earphone has been engaged with the ear.

In still another aspect, an assembly includes an earphone. The earphone includes a head that itself includes at least one speaker. The head also includes a front surface that is bounded by three sides that are optionally straight, as well as a curved bottom edge. The curved bottom edge is configured for placement on top of an incisura of an ear to hang on the incisura.

In certain example embodiments, the assembly may also include an elongated stem that includes a first end engaged with a rear portion of the head opposite the front surface, as well as a second end opposite the first end. The stem may depend down from the head when worn. The stem may also include at least one microphone disposed adjacent the second end, where the stem may be graspable with thumb, fore, and middle fingers for ergonomic gripping.

Also in certain example embodiments, the assembly may include at least one computer readable storage medium (CRSM) that is not a transitory signal. The at least one CRSM may include instructions executable by a processor to identify, at a mobile device, a trigger related to the earphone.

The trigger may include a threshold period of time elapsing from detachment of the earphone from the mobile device during call reception. The instructions may also be executable to, responsive to identification of the trigger, facilitate a call and present mono audio from the call via the at least one speaker on the earphone.

The details of the present application, both as to its structure and operation, can be best understood in reference to the accompanying drawings, in which like reference numerals refer to like parts, and in which:

BRIEF DESCRIPTION OF THE DRAWINGS

FIG. 19 shows a partial rear perspective view of the mobile phone housed within the case and electrically connected to the earphone via electrical contacts;

FIG. 19A shows an exploded view of the electrical contacts consistent with present principles;

DETAILED DESCRIPTION

Figure 1:
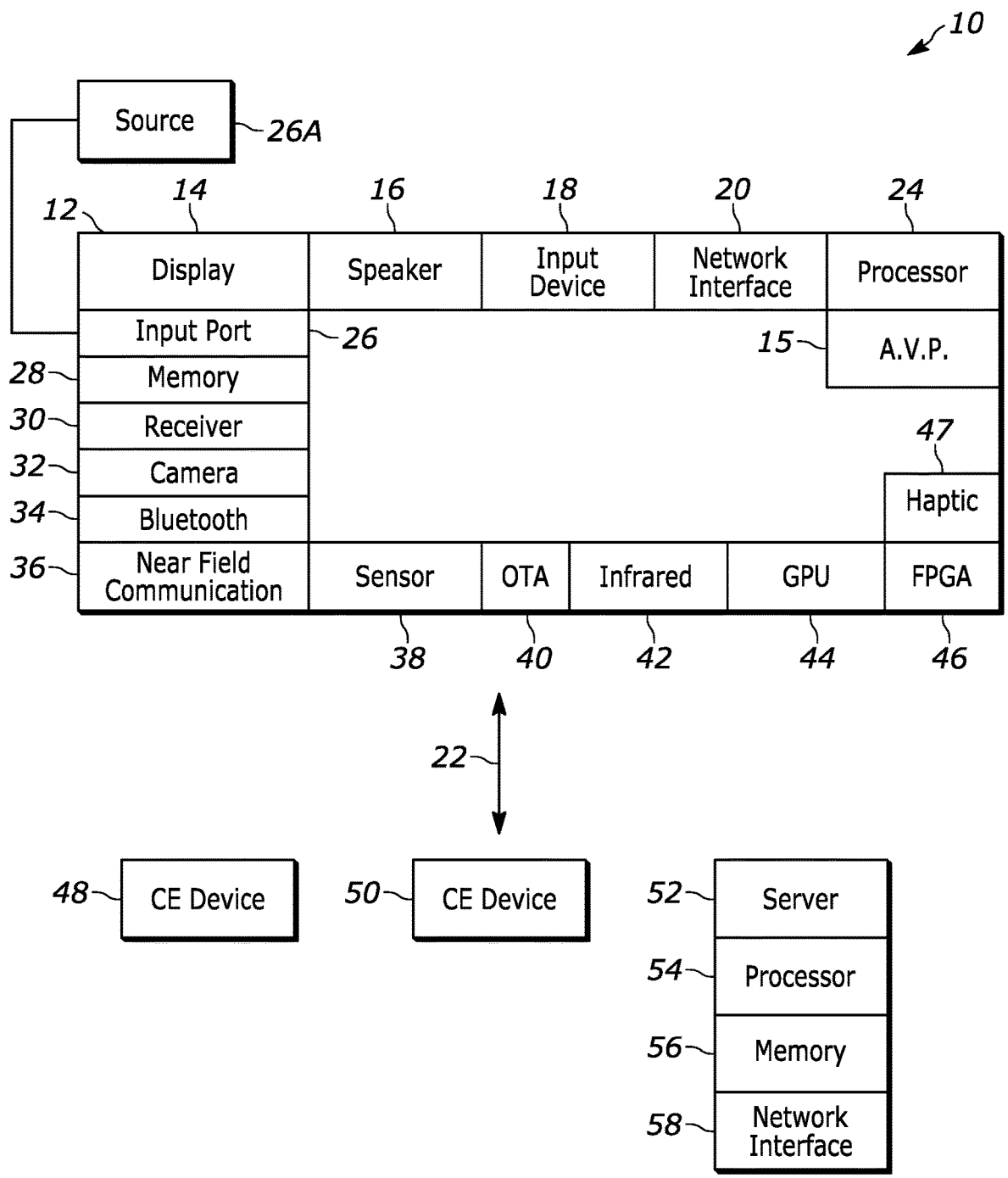
FIG. 1 is a block diagram of an example system consistent with present principles.

Disclosed below are hand-operated, ear-insertable earphone devices that have direct control over the answering, initiation, and ending of calls while also providing improved comfort for their users when inserted into the ear. These devices can be inserted into one's ear with ease and speed due to their unique ergonomics.

Accordingly, unlike left/right stereo earbuds that are used in combination to present multi-channel audio (e.g., one channel for each earbud/speaker), an earphone as disclosed herein may be singular with mono output (single channel) instead of using stereo output that might be desirable for listening to music but is less important for conducting telephone calls. The earphone devices described below may thus enable non-handed operation for use in either ear during a telephone call while also eliminating the type of tight fit that produces discomfort but that might be more preferable for high-fidelity music rendering since tight-fitting earbuds can provide relatively better sound quality. The present disclosure therefore recognizes that such a level of sound quality is often not as important for telephone conversations, particularly at the expense of comfort and convenience.

However, it is to be understood that incorporating such a mono earphone device into a mobile phone (or other type of device) does not preclude the use of stereo earbuds for listening to music since, when the mono earphone/hand earpiece device is attached to the phone (e.g., hung up), a pair of stereo earbuds may be utilized, thereby temporarily bypassing the mono earphone functionality. Also, the disclosure below recognizes the lessened need for low frequency sound reproduction since bass frequencies as often used in music would typically not be used during telephone calls and, as such, the heads of the mono earphones/hand earpiece devices disclosed herein may have reduced size/depth for the chamber containing the output speaker. This in turn may save on device space that can then be allocated to other components, make for a comfortable loose fit, and permit narrower device widths that do not project beyond the thickness of the mobile phone for comfort of carrying the phone itself when the earphone is coupled thereto. This also improves appearance and stability of retention of the earpiece to the phone when the phone is inserted into a pocket or purse, when resting flat on a charging base or other surface, etc.

Accordingly, the mono earpiece devices disclosed herein improve the utility of a mobile phone during conversations since hands are freed to operate on-screen applications during the call (e.g., allowing access to information like emails, illustrations, and other data) and privacy and comfort are also improved. This in turn may make the use of audio calls or audio/video calls (e.g., video conferences) in public more common and convenient.

As for form factor as alluded to above, the head of the mono earpiece device may have a relatively narrow and small sound-producing listening head. The mono earpiece device may also include a lengthened stem that bears the microphone at its end and also allows grasping with the thumb, fore, and middle fingers for ergonomics. The base of the stem may return toward the phone for magnetic attachment and mechanical retention of the earpiece while also making an electrical connection to the phone or phone's case for charging the earpiece as well as detection of its presence/removal for phone control.

What's more, if desired in some examples the mono earphone/earpiece may include separate up and down depressable and/or touch-enabled volume buttons on the back of the stem or head. The user may thus press the up or down button to incrementally adjust call volume up or down, respectively.

Also note that the mono earphone/earpiece (and the corresponding cradle/receiver) can be attached to any of the six sides of the phone or phone case consistent with the disclosure below. So, for example, the earpiece may be stored within an interior cavity of the phone on the back, reducing the phone's overall size.

As an example consistent with present principles, during operation and end-user may answer an incoming call by picking up the hand earpiece from the receiver on the phone, and then end the call by hanging up the hand earpiece on the receiver. In certain examples, the user may even pick up the earpiece and audibly ask a virtual assistant to dial a contact or access other information available through the assistant, and also end the call by providing an audible "end call" command to the assistant.

Prior to delving further into the details of the instant techniques, note that this disclosure relates generally to aspects of consumer electronics (CE) devices and other types of client devices and servers. Thus, devices herein may also include server and client components which may be connected over a network such that data may be exchanged between the client and server components. The client components may include one or more computing devices including mobile smart phones and other mobile devices, wearable devices, game consoles, extended reality (XR) headsets such as virtual reality (VR) headsets and augmented reality (AR) headsets, display devices such as televisions (e.g., smart TVs, Internet-enabled TVs), personal computers such as laptops, desktop, and tablet computers, and still other types of devices. These client devices may operate with a variety of operating environments. For example, a client device consistent with present principles may employ, as examples, Linux and Unix operating systems, operating systems from Microsoft, or operating systems from Apple, Inc. or Google. These operating environments may be used to execute one or more browsing programs, such as a browser made by Microsoft or Google or Mozilla or other Internet networked applications that can access websites hosted by the Internet servers over a network such as the Internet, a local intranet, or a virtual private network.

Servers and/or gateways may be used that may include one or more processors executing instructions that configure the servers to receive and transmit data over a network such as the Internet. Or a client and server can be connected over a local intranet or a virtual private network. A server or controller may be instantiated by a personal computer, mobile device, rack or blade server, etc.

As indicated above, information may be exchanged over a network between client devices and servers. To this end and for security, servers and/or clients can include firewalls, load balancers, temporary storages, and proxies, and other network infrastructure for reliability and security.

As used herein, instructions may refer to computer-implemented steps for processing information in the system. Instructions can be implemented in software, firmware or hardware, or combinations thereof and include any type of programmed steps undertaken by components of the system.

A processor may be a general-purpose single- or multi-chip processor that can execute logic by means of various lines such as address lines, data lines, and control lines and registers and shift registers.

Further to what has been alluded to above, logical blocks, modules, and circuits described below can be implemented or performed with a general-purpose or other processor, such as a central processing unit (CPU), a digital signal processor (DSP), a field programmable gate array (FPGA) or other programmable logic device, or an application specific integrated circuit (ASIC), discrete gate or transistor logic, discrete hardware components, or any combination thereof designed to perform the functions described herein. A processor can be implemented by a controller or state machine or a combination of computing devices.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

The functions and methods described below, when implemented in software, can be written in an appropriate language such as but not limited to C # or C++, and can be stored on or transmitted from a computer-readable storage medium such as a hard disk drive (HDD) or solid state drive (SSD), random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

In an example, a processor can access information over its input lines from data storage, such as a computer readable storage medium as referenced above, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device, etc.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Referring now to FIG. 1, an example system 10 is shown, which may include one or more of the example devices mentioned above and described further below in accordance with present principles. The first of the example devices included in the system 10 is a consumer electronics (CE) device 12. The CE device 12 may be a computerized Internet enabled ("smart") phone, a tablet computer, a laptop/notebook computer, a desktop computer, a head-mounted device (HMD) and/or headset such as smart glasses or AR or VR headset, another wearable computerized device, etc. Regardless, it is to be understood that the CE device 12 is configured to undertake present principles (e.g., communicate with other CE devices to undertake present principles, execute the logic described herein, and perform other functions and/or operations described herein).

Accordingly, to undertake such principles the CE device 12 can be established by some, or all, of the components shown. For example, the CE device 12 can include one or more touch-enabled displays 14 that may be implemented by a high definition or ultra-high definition "4K" or higher flat screens. The touch-enabled display(s) 14 may include, for example, a capacitive or resistive touch sensing layer with a grid of electrodes for touch sensing consistent with present principles.

The CE device 12 may also include an analog audio output port 15 to drive one or more external speakers or headphones, and may include one or more internal speakers 16 for outputting audio in accordance with present principles, and at least one additional input device 18 such as an audio receiver/microphone, e.g., for conversing telephonically or for entering audible commands to the CE device 12 to control the CE device 12. The example CE device 12 may also include one or more wired or wireless network interfaces 20 for communication over at least one network 22 such as the Internet, an WAN, an LAN, etc. under control of one or more processors 24 such as a CPU or other processor mentioned above. Thus, the interface 20 may be, without limitation, a Wi-Fi transceiver and/or wireless telephony transceiver for communicating over a wireless cellular network (e.g., operated by Verizon, T-Mobile, or AT&T), both of which are examples of a wireless computer network interface. It is to be understood that the processor 24 controls the CE device 12 to undertake present principles, including the other elements of the CE device 12 described herein such as controlling the display 14 to present images thereon and receiving input therefrom. Furthermore, also note the network interface 20 may be a wired or wireless modem or router or other suitable network interface.

In addition to the foregoing, the CE device 12 may also include one or more input and/or output ports 26 such as a high-definition multimedia interface (HDMI) port or a universal serial bus (USB) port to physically connect to another CE device, and/or a headphone port to connect headphones to the CE device 12 for presentation of audio from the CE device 12 to a user through the headphones. For example, the input port 26 may be connected wired or wirelessly to a cable or satellite source 26a of audio video content. Thus, the source 26a may be a separate or integrated set top box, or a satellite receiver. Or the source 26a may be a game console or disk player containing content.

The CE device 12 may further include one or more non-transitory computer memories/computer-readable storage media 28 such as disk-based or solid-state storage that are not transitory signals, in some cases embodied in the chassis/housing of the CE device 12 (e.g., as standalone devices) or as removable memory media or the below-described server. Also, in some embodiments, the CE device 12 can include a position or location receiver such as but not limited to a cell phone transceiver, global positioning system (GPS) transceiver, and/or altimeter 30. This transceiver may therefore be configured to receive geographic position information from a satellite or cellphone base station (and/or determine an altitude at which the CE device 12 is disposed) and then provide the information to the processor 24. However, it is to be understood that another suitable position receiver other than a GPS receiver, cell phone transceiver, and/or altimeter may be used consistent with present principles to determine the location of the CE device 12.

Continuing the description of the CE device 12, in some embodiments the CE device 12 may include one or more cameras 32 that may be thermal imaging cameras, digital cameras such as webcams, infrared (IR) sensors, and/or other types of cameras or other optical sensors integrated into the CE device 12 and controllable by the processor 24 to gather pictures/images and/or video consistent with present principles. Also included on the CE device 12 may be a Bluetooth® transceiver 34 and/or other Near Field Communication (NFC) element 36 for communication with other devices using respective Bluetooth and/or NFC wireless technologies/communication standards. An example NFC element can be a radio frequency identification (RFID) element.

Further still, the CE device 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a motion sensor such as an accelerometer, gyroscope, magnetometer, a speed and/or cadence sensor, an event-based sensor, a gesture sensor (e.g., for sensing gesture command), etc. In one specific example, the sensor 38 thus may be implemented as an inertial measurement unit (IMU) with motion sensors including individual accelerometers, gyroscopes, and magnetometers, and/or other components of that include a combination of accelerometers, gyroscopes, and magnetometers, to determine the location and orientation of the CE device 12 in three dimensions. Also in one specific example, the sensor 38 may be an event-based sensor such as event detection sensor (EDS). A gyroscope consistent with present principles may sense and/or measure the orientation of the CE device 12 and provide related input to the processor 24, an accelerometer consistent with present principles may sense acceleration and/or movement of the CE device 12 and provide related input to the processor 24, and a magnetometer consistent with present principles may sense and/or measure directional movement of the CE device 12 and provide related input to the processor 122. An EDS consistent with the present disclosure may provide an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The CE device 12 may also include an over-the-air TV broadcast port 40 for receiving OTA TV broadcasts and providing the input to the processor 24. In addition to the foregoing, it is noted that the CE device 12 may also include an IR transceiver 42 such as an IR data association (IRDA) device. A battery (not shown) may be provided for powering the CE device 12, as may a kinetic energy harvester that may turn kinetic energy into power to charge the battery and/or power the CE device 12. A graphics processing unit (GPU) 44 and field programmable gated array 46 also may be included. One or more haptics/vibration generators 47 may be provided for generating tactile signals/vibrations that can be sensed by a person holding or in contact with the device. The haptics generators 47 may thus vibrate all or part of the CE device 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

In addition to the CE device 12, the system 10 may include one or more other CE devices/types. In one example, a CE device 48 may be a smart speaker assembly or other device and may not have a video display. Or, the first CE device 48 may include a computer game console that can be used to send computer game audio and video to the CE device 12 via commands sent directly to the CE device 12 and/or through the below-described server. A second CE device 50 may include similar components as the first CE device 48. In the example shown, the CE device 50 may be an earphone that is configured to communicate via Bluetooth or other wireless signals with the CE device 12 consistent with present principles. Or, the CE device 50 may be configured as a head-mounted display (HMD) that may include a heads-up transparent or non-transparent display for respectively presenting AR/MR content or VR content (more generally, extended reality (XR) content). The HMD may be configured as a glasses-type display or as a bulkier VR-type display vended by computer hardware manufacturers.

In the example shown, only three CE devices are shown, it being understood that fewer or more devices may be used. A device herein may implement some or all of the components shown for the CE device 12. Any of the components shown in the following figures may incorporate some or all of the components shown in the case of the CE device 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22 (e.g., the Internet), and indeed may facilitate communication between servers and client devices in accordance with present principles. Note that the network interface 58 may be, e.g., a wired or wireless modem or router, Wi-Fi or Ethernet transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments. Or the server 52 may be implemented by one or more computers in the same room as the other devices shown, or nearby.

The components shown in the following figures may include some or all components shown herein. Any user interfaces (UI) described herein may be consolidated and/or expanded, and UI elements may be mixed and matched between UIs.

Figure 2:
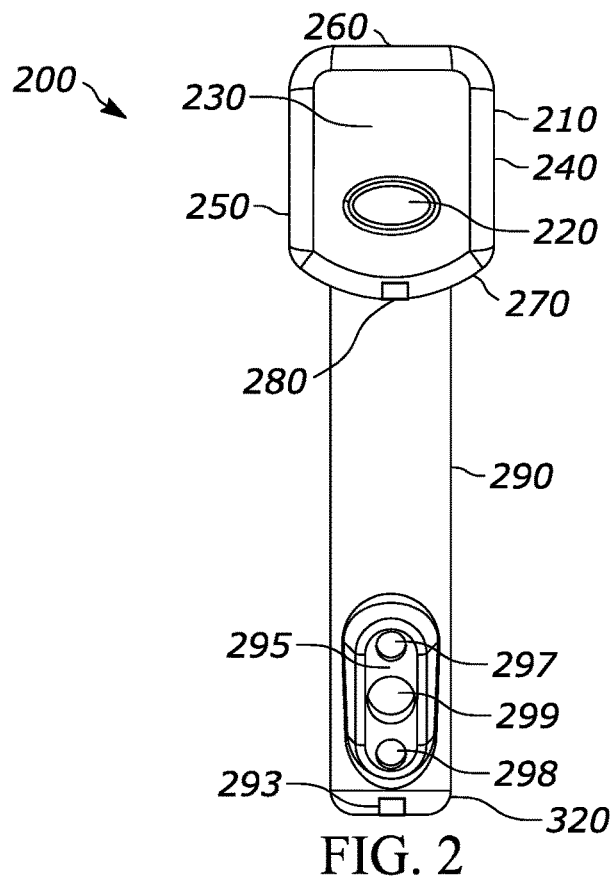
FIG. 2 shows a front elevational view of an example earphone consistent with present principles.

Now in reference to FIG. 2, a front elevational view of an example rigid earphone 200 consistent with present principles is shown. The rigid earphone housing may therefore be made of plastic, polymer, elastomer, ceramic, ferrous metals, nonferrous metals such as aluminum, and/or other suitable materials. Materials used for the housing may be uncoated, coated, and/or plated. The earphone 200 may include a head 210 configured for facing toward an ear canal of a user's left or right ear. The head 210 may include at least one speaker 220 for presenting mono audio during telephone calls (e.g., audio-only calls or audio/video calls such as video conferences). The speaker 220 may also be used for presenting mono audio for podcasts, newscasts, text to speech, etc.

As also shown in FIG. 2, the head 210 may include a flat front surface 230 facing into the ear canal when worn by the user in either ear. And while flat, in some specific examples the surface 230 may not be straight but instead may be slightly curved from top to bottom (with a middle apex) for comfort. In other examples, the surface 230 may in fact be straight and not curved from top to bottom, or may even be concave.

The flat front surface 230 may be bounded by three straight sides 240, 250, and 260 (straight in at least the X-Y plane even if the surface 230 itself is curved from top to bottom in the Z dimension). The surface 230 may further include a curved bottom edge 270 as shown (curved in the X-Y plane). The straight sides 240 and 250 may be vertical sides of the head 210 and the straight side 260 may be a top, horizontal side.

The curved bottom edge 270 may be configured for placement on top of the incisura, or intertragic notch as it is sometimes called, to hang on the incisura, with other portions of the flat front surface 230 (including the sides 240-260) extending into in the lower concha cavum. The degree of curvature of the curved bottom edge 270 may be a 0.8 centimeter radius in particular non-limiting examples. The sides 240, 250 may in some examples be configured to abut other portions of the lower ear inside the lower concha cavum when placed into the ear to help hold the earphone 200 in place, such as inward-facing surfaces of the tragus and antitragus, to face toward the ear canal when worn and possibly abut some or all of its opening without necessarily sealing around the ear canal's opening as stereo ear buds are often designed to do. As such, the width of the front surface 230 from edge 240 to edge 250 may be 0.85 to 1.1 centimeters in non-limiting examples, and preferably 0.9 centimeters in specific non-limiting examples. But also note in at least some examples, the flat front surface 230 may not even contact or at least not exert pressure on the ear canal/canal opening itself. In either case, the configuration of straight sides 240-260 and curved bottom edge 270 may facilitate improved ergonomics related to user comfort and convenience while still delivering call audio to the user's ear via the speaker 220, eliminating the type of radial outward pressure and transverse inward pressure that circular and semi-circular stereo ear buds tend to produce (which in turn lead to user discomfort) when inserted firmly against and/or into the ear canal opening itself when those types of ear buds are used for high-fidelity stereo audio rendering of music and isolating the ear from outside noise (since, as recognized herein, high-fidelity sound quality is not as important during telephone calls and present principles value ergonomics such as comfort and convenience more). Regardless, sound quality, passive external noise rejection/cancellation, and privacy may still be improved over holding the CE device/phone itself up against one's ear. Improved ergonomics are also realized by the increased speed with which the head 210 may be engaged with the ear relative to the additional time it might take to position circular and semi-circular stereo ear buds into ear canals of one or both ears. And further note for completeness that the height of the front surface 230 from the edge 260 to the apex of the curved bottom edge 270 may be 1.0 to 1.5 centimeters in non-limiting examples, and preferably 1.1 centimeters in one specific non-limiting example, so that the edge 260 need not contact portions of the ear extending laterally/obliquely away from the head to improve comfort, or might merely abut a lower part of the crus helix without exerting upward pressure on the crus helix to cause discomfort.

As also shown in FIG. 2, in some non-limiting examples a lower portion of the front surface 230 or even the adjacent, generally downward-facing surface of the head 210 extending from the bottom edge 270 toward the back of the head 210 may include one or more sensors 280 such as capacitive or resistive touch sensors, infrared (IR) sensors, or other types of sensors to sense contact/engagement of the head 210 with the user's ear. The sensor(s) 280 may thus provide their input to a processor on the earphone 200 itself, with that processor then controlling a Bluetooth, NFC, Wi-Fi or other type of wireless transceiver on the earphone 200 to report the input/engagement of the earphone 200 with the ear to a paired mobile phone or other type of device with which the earphone 200 is wireless communicating. To this end, note that both the earphone 200 and mobile phone (not shown) may include some or all of the components described above in reference to the CE device 12. Also note that the earphone 200 may be configured for mechanical and/or magnetic engagement with the mobile phone itself, as will be described more later.

Figure 3:
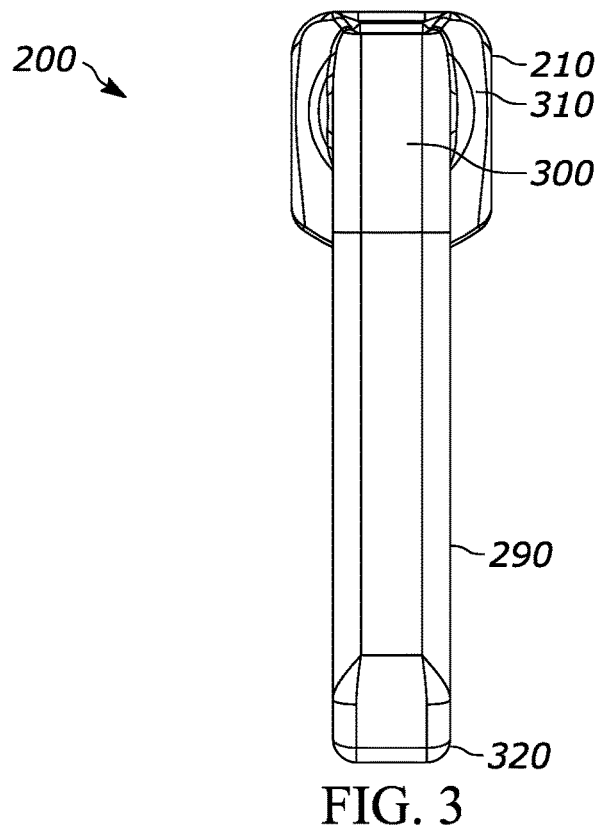
FIG. 3 shows a rear elevational view of the example earphone consistent with present principles.

The earphone 200 may also include an elongated stem 290 including a first end 300 engaged with a rear portion 310 of the head 210 that is opposite the flat front surface 230, with the rear portion 310 better shown in the rear elevational view of FIG. 3. The stem 290 may also include a second end 320 opposite the first end 300. The stem 290 may thus depend down from the head 210 when worn. The stem 290 may be graspable with thumb, fore, and middle fingers for ergonomic gripping for insertion and removal into the user's ear. In non-limiting examples, the stem 290 may be 3.1 to 3.8 centimeters in length from the bottom end 320 to the bottom of the shoulder joint where the stem 290 connects to the head 210.

Additionally, as best shown in FIG. 2, a lower portion of the stem 290 at or near the end 320 may include another flat front surface 295 along with sidewalls extending laterally away from the stem 290 to the surface 295 (relative to the stem's long axis) and thus toward the user's head when the earphone 200 is worn so that the surface 295 faces generally toward the user's head when the earphone 200 is engaged with the left or right ear as described above. But further note that the plane of the surface 295 itself may be oblique with respect to the long axis of the stem.

As shown in FIG. 2, the surface 295 itself may include upper and lower electrical contacts 297, 298 (or other types of electrical connectors) to electrically engage the mobile phone. Thus, the contacts 297, 298 may receive electric current from the mobile phone when electrically engaged to thus charge a battery within the earphone 200 (e.g., when the earphone 200 is not in use but is instead physically coupled to the mobile phone). The contacts 297, 298 may also be used to sense the physical engagement of the earphone 200 with the mobile phone for purposes to be described more later. The lower front surface 295 may also include a magnet 299 that is configured to magnetically couple the earphone 200 to the mobile phone when engaged therewith by attracting metal or another magnet on a reciprocal portion of the mobile phone to thus physically engage the earphone 200 with the mobile phone (e.g., via the phone's integral housing or detachable phone case.

FIG. 2 also shows that at least one microphone 293 may be disposed on the stem 290 adjacent the second end 320, such as on a bottom surface of the end 320 or a lower front surface of the stem 290. The microphone 293 may be electrically connected to the processor within the earphone 200 to provide input thereto, which the processor of the earphone 200 may then wirelessly communicate to the mobile phone itself. Thus, a user may speak into the microphone 293 to participate in a call facilitated through the mobile phone. Also note that in certain example embodiments, the microphone 293 may be a microelectromechanical systems (MEMS) microphone/microphone array that uses charged crystalline discs to transduce sound.

As also shown in FIG. 2, side edges of the head 210 connecting the side edges of the surface 230 itself to sidewalls of the head 210 may be curved and/or extend obliquely out and back away from the surface 230 to the sidewalls to further aid user comfort. Top and bottom edges of the head 210 connecting the top and bottom edges of the surface 230 to upper and lower surfaces of the head 210 may be similarly configured. This is further illustrated in the side elevational view of FIG. 4. As may be appreciated from FIG. 4, one of the sidewalls 400 of the head 210 is shown and may be generally orthogonal to the front surface 230, with an edge 410 of the head 210 from the side edge 240 of the front surface 230 to the sidewall 400 being curved as also shown.

Figure 4:
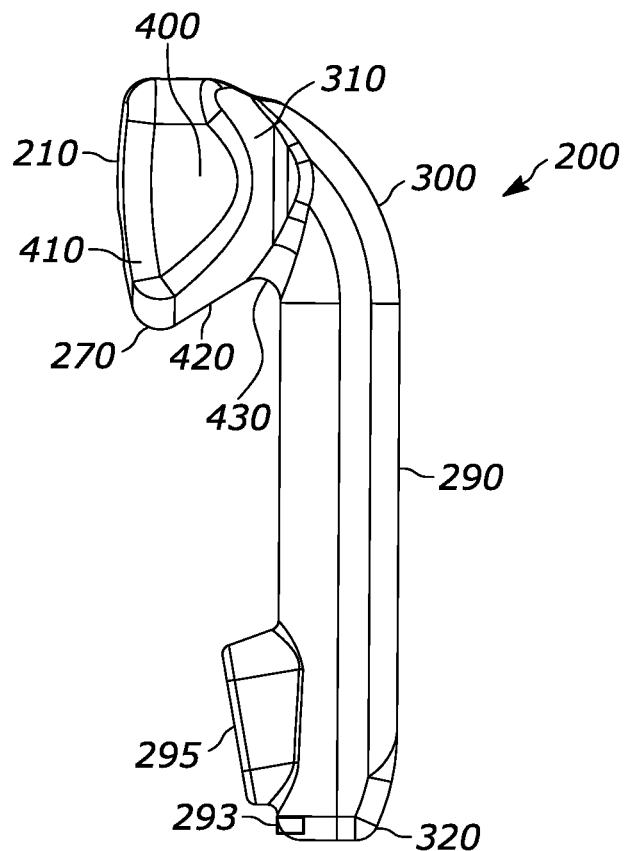
FIG. 4 shows a side elevational view of the example earphone consistent with present principles.

As may also be appreciated from FIG. 4, the depth of the head 210 from the front surface 230 (e.g., from its apex if curved from top to bottom as mentioned above) to the curved rear portion 310 that couples to the stem 290 may be relatively shallow for sound production, creating a low profile for the head 210 to further facilitate ergonomics and user comfort even if sacrificing ability to produce of certain bass frequencies. As such, it is recognized herein that the total depth of the head 210 as defined by the surface 230, sidewalls (such as side wall 400), and rear portion 310 may be in the range of 1.0 to 1.5 centimeters in non-limiting examples, and preferably 1.3 centimeters in one specific non-limiting example. So, for example, the depth from the edge 240 to the back-most part of the rear portion 310 (e.g., at which the stem 290 might join) may be 1.0 to 1.5 centimeters in non-limiting examples, and the other side of the head 210 with the other sidewall may be the same. Thus, even if preventing certain lower frequencies such as those in bass frequency ranges from being reproduceable by the speaker 220, since the earphone 200 would be used more for telephone calls than high-fidelity reproduction of music, lower frequency sound reproduction and speaker performance may be sacrificed to improve user comport and ergonomics.

Still in reference to FIG. 4, to further aid comfort and other ergonomics, the bottom surface 420 of the head 210 may slope up to the shoulder joint 430 where the head 210 couples to the stem 290 as shown. The shoulder joint 430 itself, to help establish the sloping of the bottom surface 420, may therefore establish an angle between forty and fifty degrees in the Y-Z plane in non-limiting embodiments, and preferably forty five degrees in the Y-Z plane in specific non-limiting embodiments.

Figure 5:
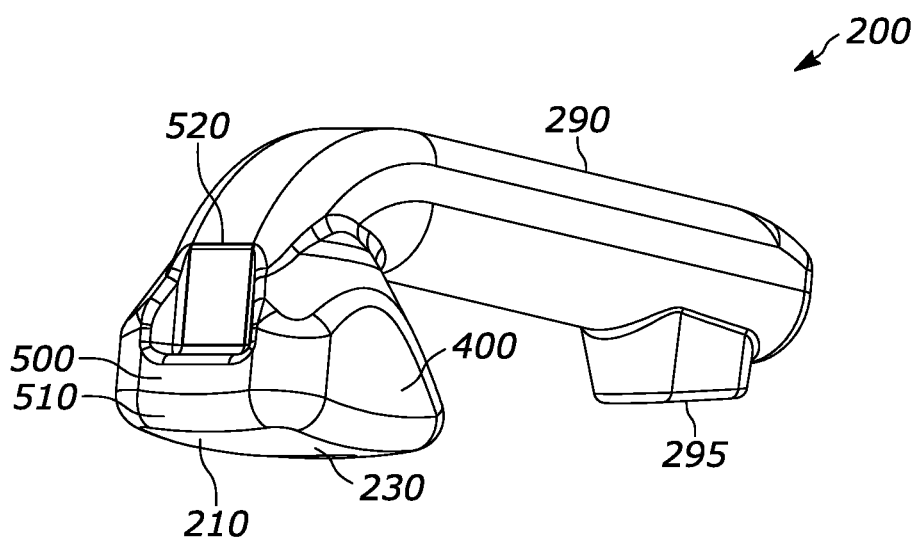
FIG. 5 shows a perspective view of the example earphone consistent with present principles.

Now in reference to the perspective view shown in FIG. 5, the top surface 500 of the head 210 is shown, with a curved or oblique edge 510 from the side 260 to the surface 500 also being shown. FIG. 5 further shows that a generally box-shaped receiving slot/indentation 520 may be included in the top surface 500, with the indentation 520 including sidewalls, a front wall nearest the surface 230, and a bottom surface that is rectangular in non-limiting examples. The indentation 520 may not establish a rear wall in some non-limiting examples. The indentation 520 is thus configured for engaging a tab on a housing of the mobile phone or other device with which the earphone 200 is paired. This feature will be discussed more below in reference to FIG. 7, but first FIG. 6 will be described.

Figure 6:
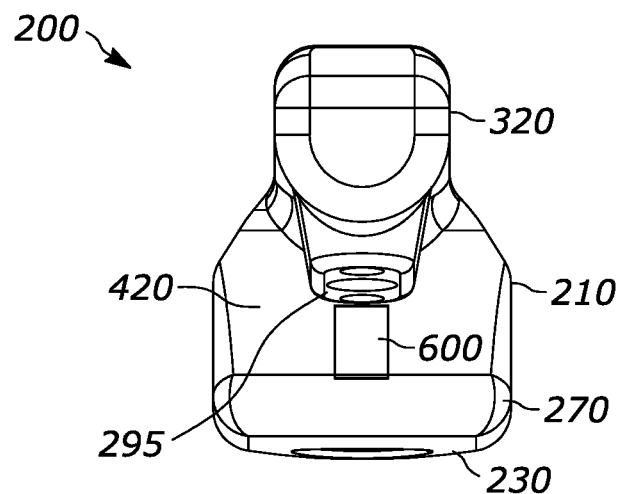
FIG. 6 shows a bottom elevational view of the example earphone consistent with present principles.

Accordingly, FIG. 6 shows a bottom elevational view of the earphone 200. As shown in this figure, the bottom surface 420 may have a smooth, frustoconical shape in non-limiting examples.

Now in reference to FIG. 7, a perspective view is shown of the earphone 200 mechanically and magnetically engaged with an earphone cradle/receiver 700 that, at its lowest point, may have a height of 1.5 millimeters in non-limiting examples to save space, as will be made more apparent in reference to FIG. 8 below. But still in reference to FIG. 7, it is to be understood that although not shown for simplicity, the receiver 700 may be affixed to the housing of a mobile phone or other device using glue, screws, etc., and/or through molding into the housing of the mobile phone or other device. The device housing may therefore be configured to couple the earphone 200 to the mobile phone itself. The device housing may be a built-in/integral housing of the mobile phone that encases and protects internal components of the phone. Additionally or alternatively, the housing may be a detachable mobile phone/device case that is detachable by hand without the aid of a tool and protects the built-in/integral housing itself.

Figure 7:
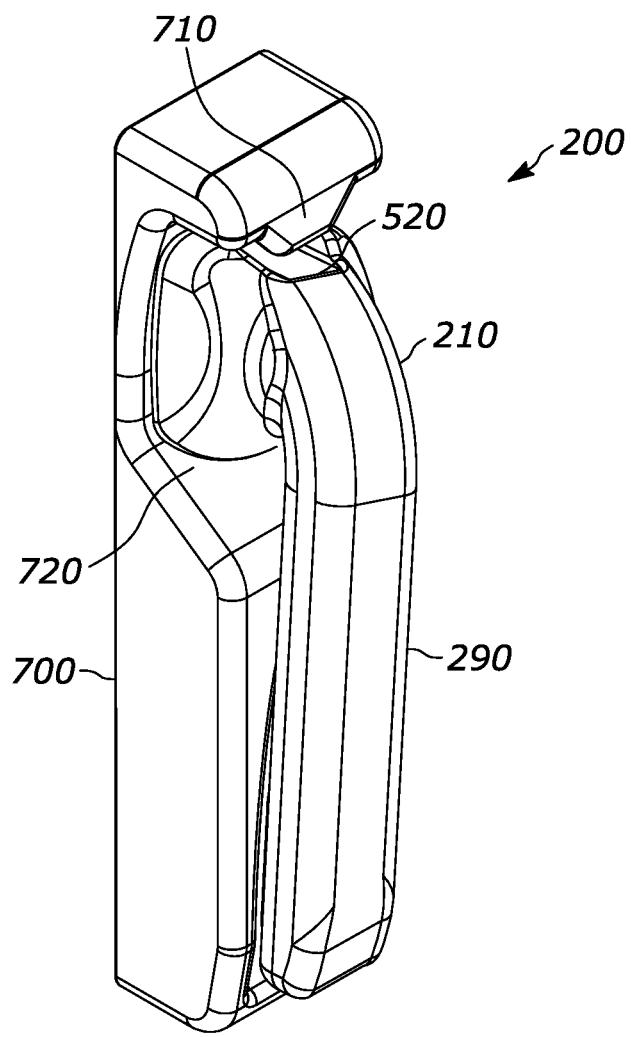
FIG. 7 shows a perspective view the earphone as mechanically and magnetically engaged with an example receiver consistent with present principles.
Figure 8:
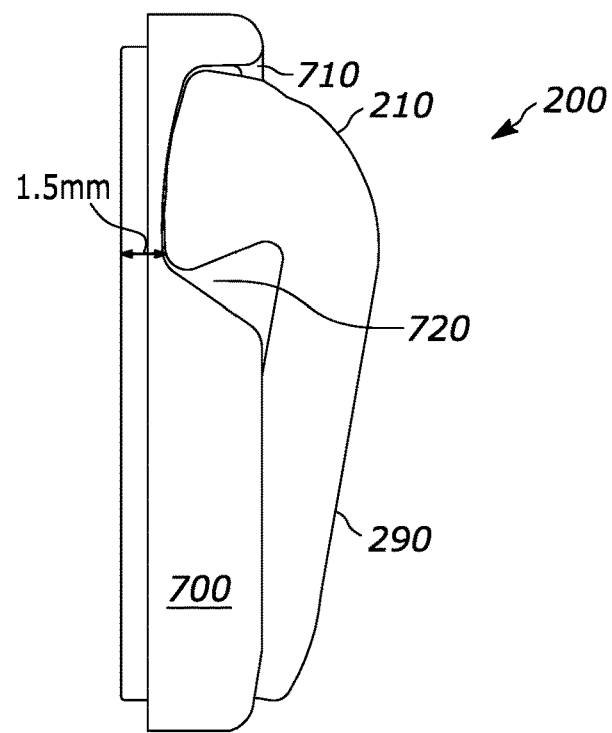
FIG. 8 shows a side elevational view of the earphone and receiver consistent with present principles.
Figure 9:
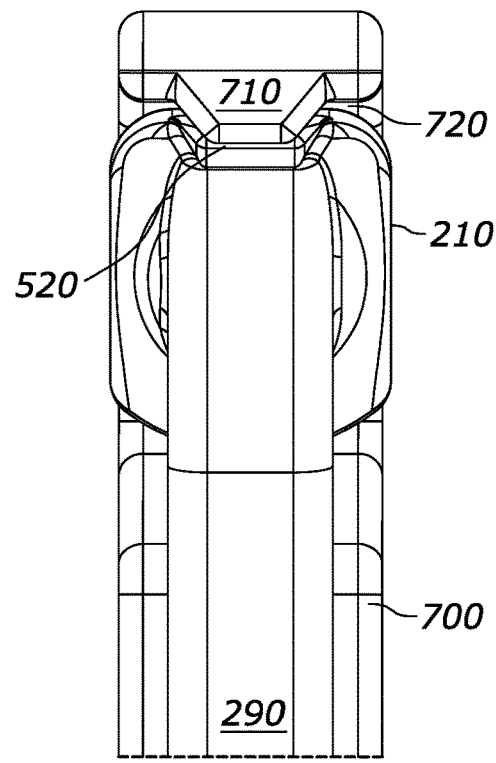
FIGS. 9 and 10 show partial front elevational views of the earphone and receiver consistent with present principles.

In any case, as shown in FIG. 7, a retaining hook/tab 710 may protrude vertically downward from an upper portion of the receiver 700 to engage the indentation 520 and help secure the head 210 in place within an inlet 720 of the receiver 700 when the earphone 200 is not in use. This is in part due to the front wall of the indentation 520 abutting the inward-facing surface of the tab 710 that faces the front wall itself and due to the possibly oblique side walls of the indentation 520 abutting reciprocal oblique side surfaces of the tab 710, preventing the head 210 from lateral and straight backwards movement away from the receiver 700. The side elevational view of FIG. 8 and partial front elevational view of the receiver 700 shown in FIG. 9 further illustrate this feature.

However, note that in addition to or in lieu of the receiver tab 710 and indentation 520, the assembly may include one or more magnets on or near the surface 230 of the head 210 that may be configured to attract reciprocal magnets or even metal on the receiver 700 within the inlet 720 to secure the head 210 within the inlet 720. Additionally or alternatively, magnets and/or metal on the receiver 700 may be configured to attract the magnet and metallic structure within the speaker 220 that drives the speaker/is used for producing audio to also secure the head 210 within the inlet 720, thereby saving space within the device to allocate to other components instead of including an additional magnet for securing the headphone 200. Regardless, the magnets themselves may be ferrite or neodymium magnets, or even other types of rare earth magnets.

Figure 10:
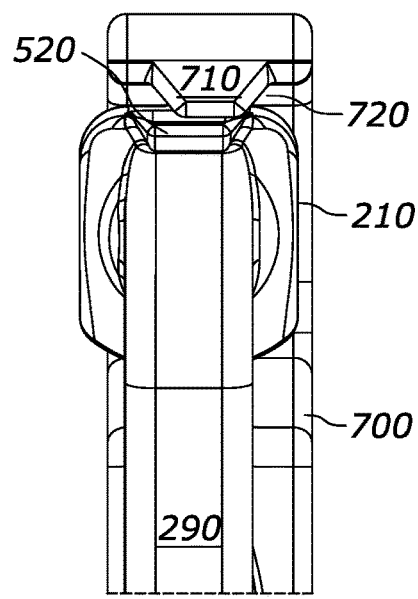

FIG. 10 also shows a partial front elevational view of the receiver 700 to further illustrate the engagement of the receiver 700 with the earphone 200 via the tab 710 and indentation 520. This figure demonstrates that should the earphone 200 be jostled laterally left or right relative to the receiver 700, the tab 710 may help continue to secure the head 210 of the earphone 200 in place owing to the tab 710 abutting a sidewall of the indentation 520 upon jostling, preventing further movement. In the present example, the tab 710 abuts the right sidewall of the indentation 520 based on jostling of the head 210 to the left according to the perspective shown.

Figure 11:
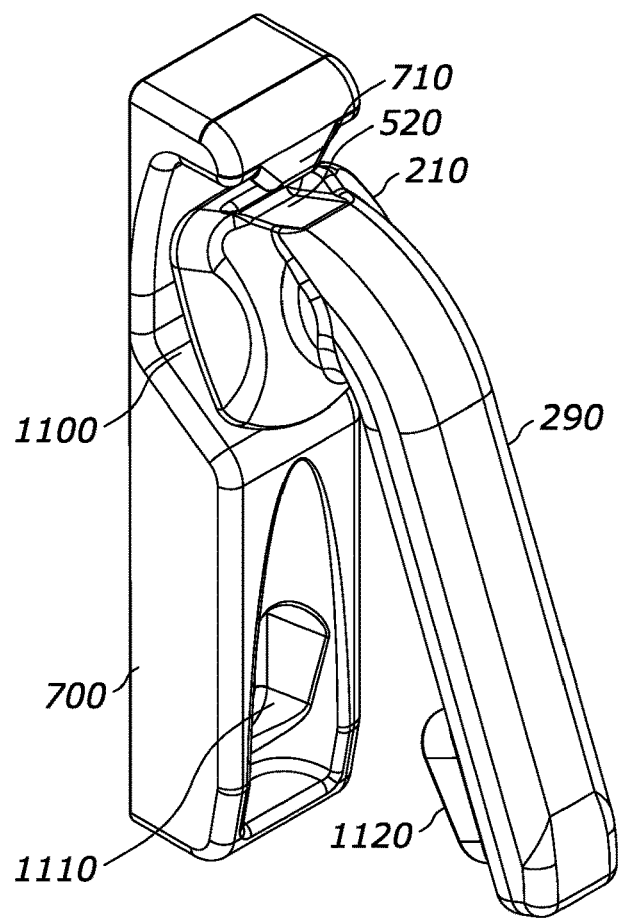
FIG. 11 shows a perspective view of the earphone and receiver with the earphone partially removed from the receiver consistent with present principles.
Figure 12:
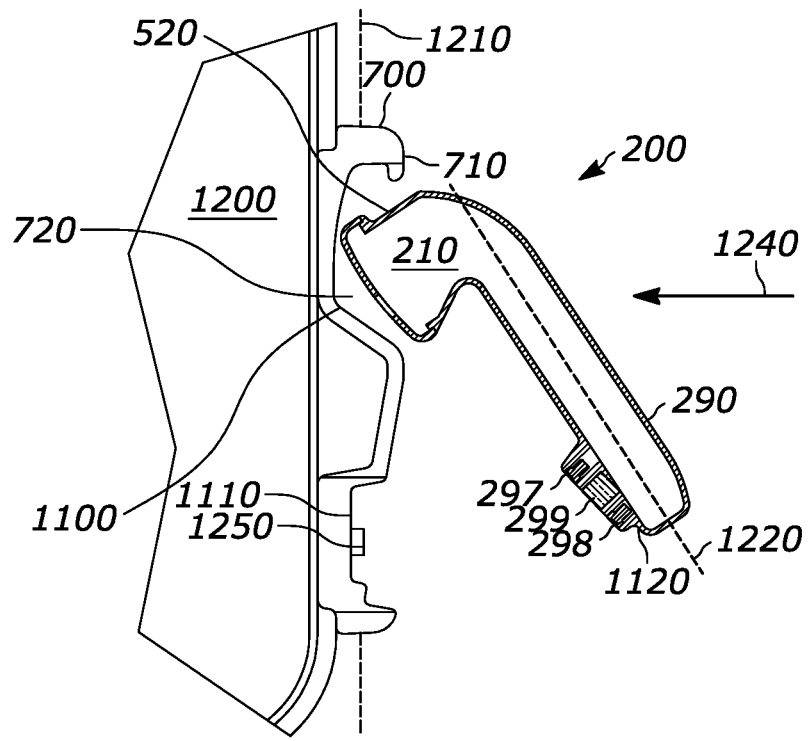
FIGS. 12-14 show side elevational views of the earphone at various stages of being placed within the receiver consistent with present principles.
Figure 13:
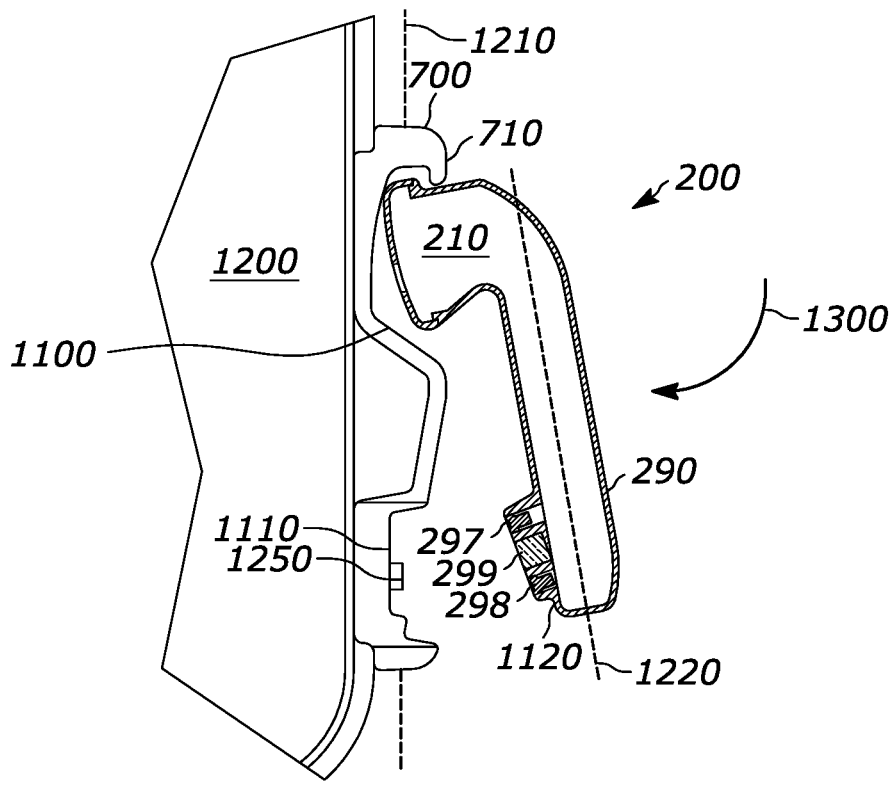
Figure 14:
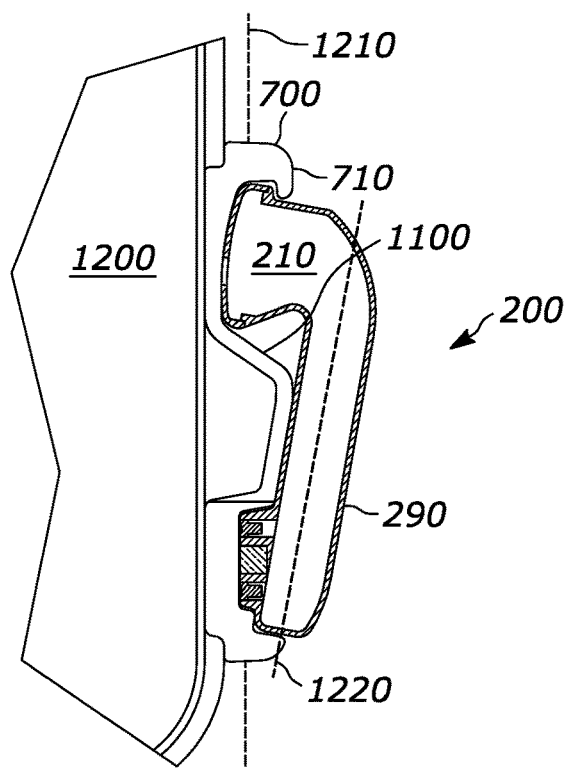

Now in cross-reference to the perspective view of FIG. 11 and side elevational views of FIGS. 12-14, removal/disengagement of the earphone 200 from the receiver 700 under control of a user is shown in FIG. 11, which might occur if the user wishes to initiate or answer a call via the earphone 200. Then placement of the earphone 200 back in the receiver 700 is shown in FIGS. 12-14. To remove the earphone 200 from the receiver 700, the user may grasp the stem 290 and radially rotate the stem 290 up and away from the lower portion of the receiver 700 (overcoming the magnetic attraction of the magnet 299 to the receiver 700 in the process). This in turn may change the orientation of the head 210 within the inlet 720, allowing the tab 710 to disengage the indentation 520 and thereby permit removal of the head 210 from the inlet 720 and hence removal of the earphone 200 from the receiver 700 itself. Note that this is made possible in part due to a lower face 1100 of the inlet 720 being sloped obliquely downward out away from the mobile phone itself, with part of the housing 1200 of the mobile phone being shown in FIGS. 12-14 to further illustrate.

As mentioned above, FIGS. 12-14 also demonstrate how the earphone 200 may be placed back into the receiver 700. As shown in FIG. 12, with a long axis 1220 of the stem 290 positioned at an oblique angle with respect to a long axis 1210 of the receiver 700 as shown so that the tab 710 does not impede movement of the head 210 into the inlet 720, the head 210 may be moved in the horizontal plane toward the inlet 720 and positioned partially therewithin. This is demonstrated by movement arrow 1240.

Then as demonstrated by movement arrow 1300 in FIG. 13, the user may radially move the stem 290 toward the receiver 700 so that the axes 1220 and 1210 approach becoming parallel with each other. This in turn may rotate the tab 710 into the indentation 520 to ultimately secure the head 210 within the inlet 720 as shown in FIG. 14, with it being noted that the axes 1220, 1210 meat one point be parallel to each other during rotation but ultimately may again be oriented oblique with respect to each other once the earphone 200 is fully placed within the receiver 700. Additionally, further note that when removing the earphone 200 from the receiver 700, in at least some examples grasping the stem 290 and pulling it backward/outward away from the receiver 700 may naturally produce arc movement in a direction opposite the direction of movement arrow 1300, possibly without deliberate radial stem movement from the user, based on the contours/physical configuration of the inlet and head 210.

Also with respect to FIGS. 11-14, note that the receiver may further include a second inlet 1110 that is configured to receive a protrusion 1120 that itself is established by the surface 295 and sidewalls that adjoin the surface 295 to a lower end portion of the stem 290 as shown and already described above. One or more magnets and/or a piece of metal 1250 may be arranged at or near the exposed surface of the inlet 1110 to attract the magnet 299 to the metal/magnet 1250 on the reciprocal portion of the inlet 1110 to also help physically engage the earphone 200 to the receiver 700 of the mobile phone's housing 1200. Not further that the configuration of the inlet 1110 to closely receive and establish an interference fit with the protrusion 1120 may help further secure the earphone 200 within the receiver 700 in case of jostling and other movement that might otherwise dislodge the earphone 200 from the receiver 700.

Still further, note that although not shown for clarity, reciprocal electrical contacts may be disposed within the inlet 1110 to establish electrical connections with the contracts 297, 298. If the receiver 700 is disposed on a detachable mobile phone case, these reciprocal electrical contacts within the inlet 1110 may themselves be electrically connected through wires or other inward-facing electrical contacts on the case itself so that an electrical path is ultimately established from the internal circuitry of the earphone 200 itself to the internal circuitry within the mobile phone (e.g. circuitry running to the phone's internal battery) through the series of reciprocal contact pairs. However, note that if the receiver 700 is instead disposed on the built-in, integral housing of the mobile phone itself, the intermediary electrical contacts or other electrical connectors between the case and mobile phone may not be necessary and the contacts 297, 298 may directly contact reciprocal contacts on the integral housing of the mobile phone itself to establish an electrical path from the internal circuitry of the earphone 200 to the internal circuitry of the mobile phone.

In either case (receiver 700 incorporated into integral housing or the detachable case), the electrical path(s) may be used to provide power from the phone's internal battery, or even a wired AC wall charger or wireless induction charger for the phone, to the battery within the earphone 200 to charge the earphone's battery. A break in the electrical connection between the mobile phone and earphone 200 may also be sensed by the mobile phone's battery management system (BMS) for the phone's battery management unit (BMU) or another processor within the mobile phone to thus determine that the earphone 200 has been removed from the charging circuit and/or receiver 700 itself during call reception or to place a call, as will be described further below.

However, first note that in addition to or in lieu of the foregoing electrical contacts, wireless induction charging may also be used to charge the earphone 200. Thus, a wireless induction charger may be juxtaposed at or near the inlet 1110 within the receiver 700/mobile phone itself to wirelessly charge the battery in the earphone 200 when the earphone 200 is in the receiver 700. Accordingly, both the wireless charger on the mobile phone/receiver 700 and wireless charge receiver in the earphone 200 may be configured for wireless charging via a magnetic field using inductive wireless charging principles. As such, the charger in the mobile phone and the charge receiver in the earphone 200 may each include a coil with at least one wire disposed around a magnet to transceive power via the magnetic/electromagnetic field that is created. Further note that here too a break in the wireless power connection between the wireless charger and wireless charge receiver may be sensed by the mobile phone's BMS for the phone's BMU or other processor to determine that the earphone 200 has been removed from the charging circuit and hence receiver 700 itself during call reception or to place a call.

Before moving on to the description of other figures, further note that in certain non-limiting examples the position, field strength, and axis of the magnetic field near the microphone 293 (not shown in FIGS. 11-14 for simplicity) due to the magnet(s) 1250 and/or 299 may be managed to prevent interference with the microphone's operation. Thus, the magnet(s) 1250 may be positioned in the receiver 700 (and even magnet 299 positioned in the earphone 200) so that the axis of the magnetic field from the magnet(s) 1250 and/or 299 is not pointed directly at the microphone 293, which at the very least could cause the microphone's performance to be diminished over time (and the microphone hardware itself to possibly be damaged). To this end, in certain non-limiting examples, the axis of the magnetic field of the magnet within the microphone 293 (e.g., moving coil and ribbon type microphones) itself may be configured to be orthogonal to the axis of the magnetic field from the combined magnets 1250 and 299 while the earphone 200 is secured/engaged within the receiver 700, and orthogonal to the axis of the magnetic field merely from magnet 299 while the earphone 200 is removed from the receiver 700. But further note that this may not apply to crystal (piezoelectric) microphone types in certain examples.

Figure 15:
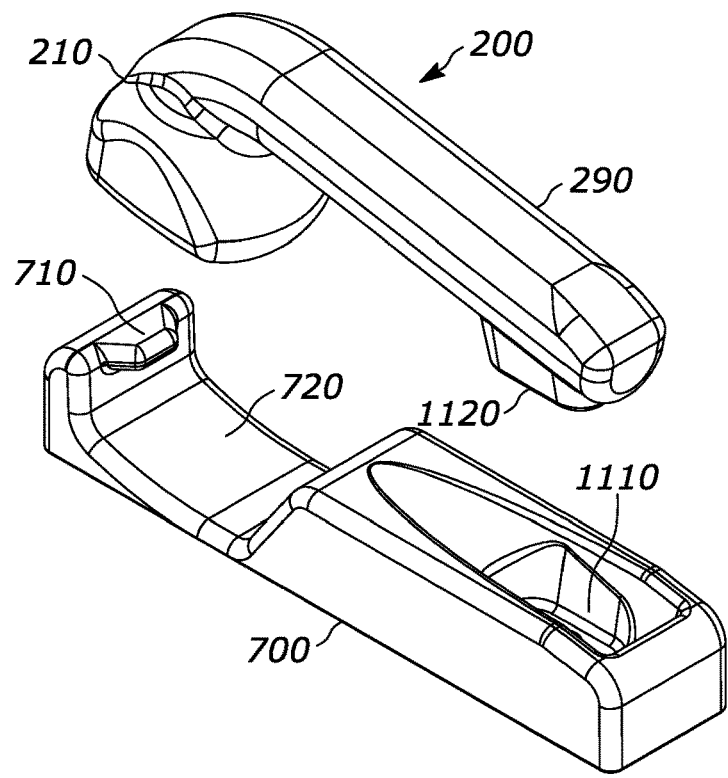
FIGS. 15 and 16 show additional perspective views of the earphone and receiver spaced apart from each other to show additional hardware design related to the earphone and receiver consistent with present principles.
Figure 16:
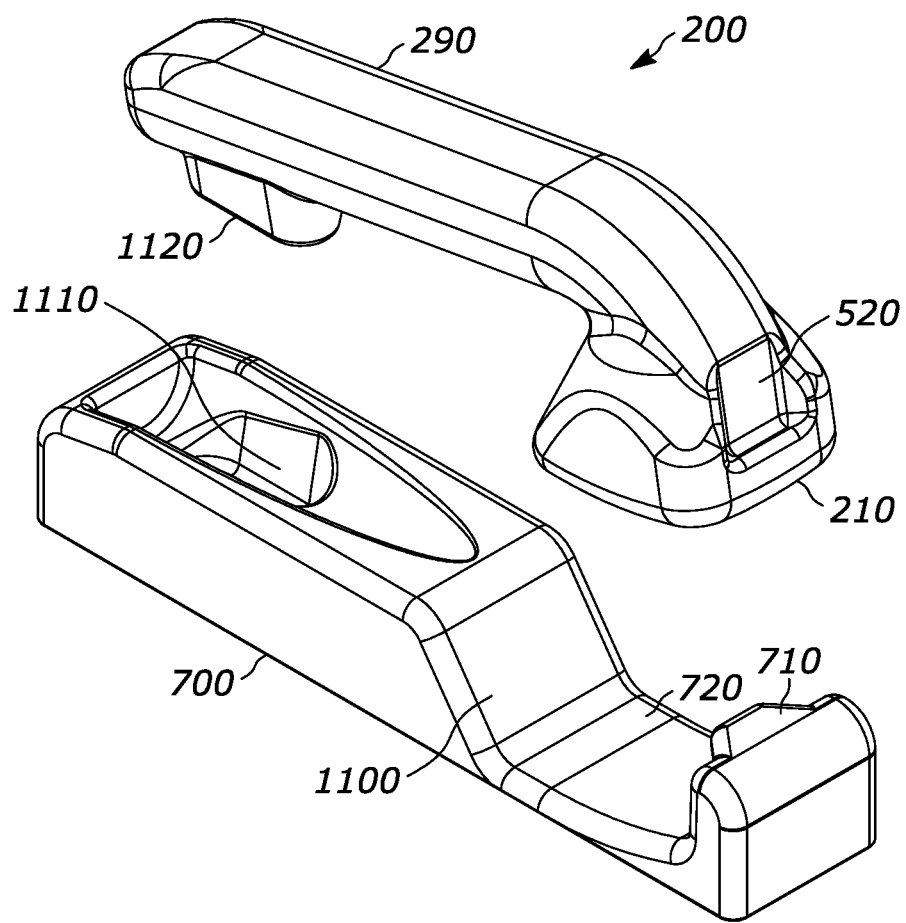

Now in cross-reference to FIGS. 15 and 16, additional perspective views are shown of the earphone 200 and receiver 700. As may be further appreciated from these figures, once the protrusion 1120 has been fully placed within the inlet 1110, unintentional dislodging of the earphone 200 due to jostling may be minimized since the protrusion 1120 and inlet 1110 may be engaged via an interference fit. Thus, left, right, up, and down movement of the protrusion 1120 within the inlet 1110 (and hence earphone 200 within the receiver 700 more generally) may be minimized while still allowing movement of the protrusion 1120 away from the inlet 1110 in the third dimension to disengage the earphone 200 from the receiver 700 when desired by the end-user.

Figure 17A:
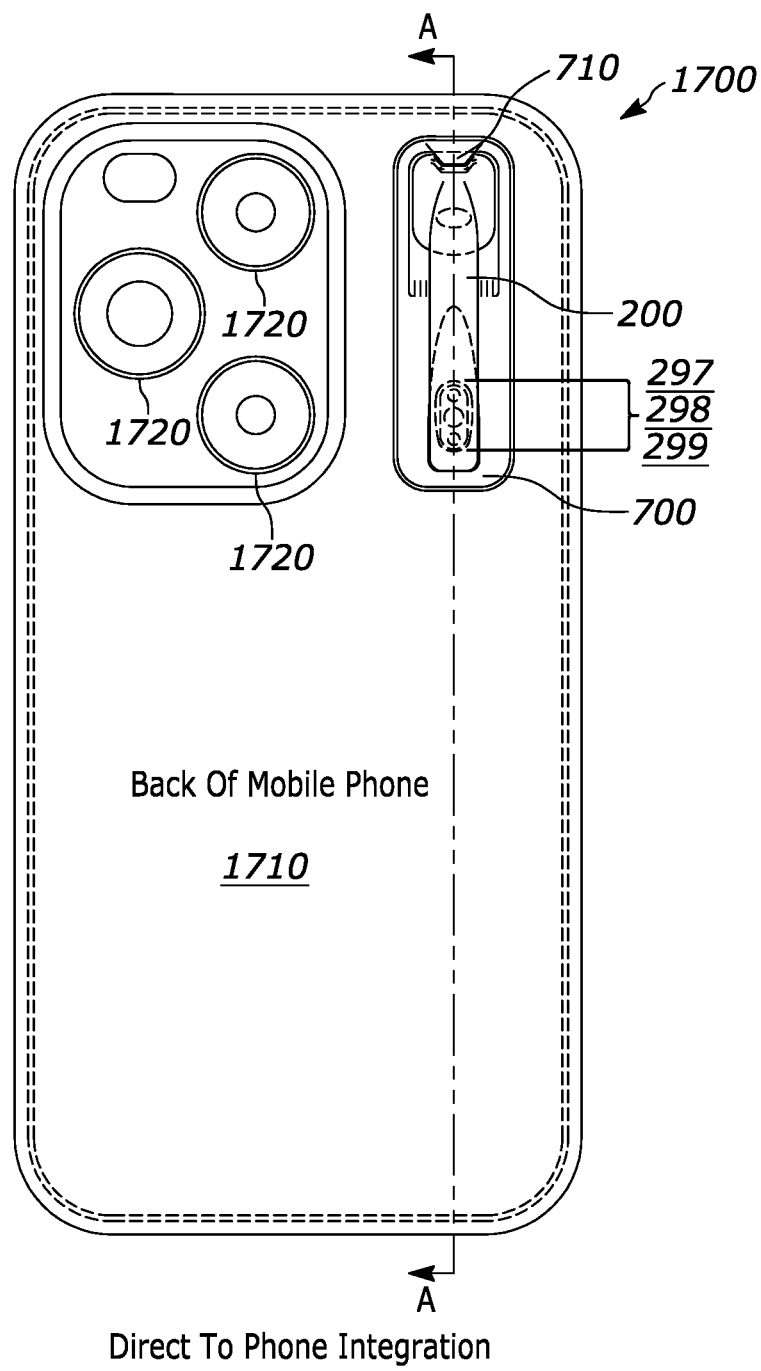
FIG. 17A shows a rear perspective view of a mobile phone engaged with the earphone consistent with present principles.
Figure 17B:
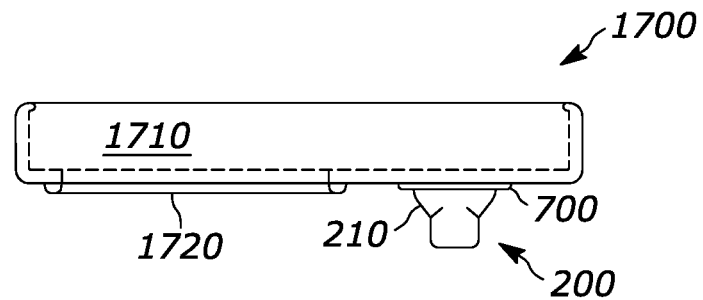
FIG. 17B shows a top plan view of the mobile phone engaged with the earphone consistent with present principles.
Figure 17C:
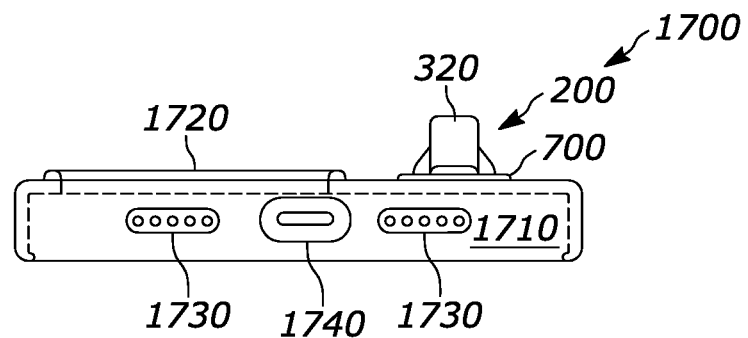
FIG. 17C shows a bottom plan view of the mobile phone engaged with the earphone consistent with present principles.

Continuing now in reference to FIGS. 17A-17E, an example is shown where the receiver 700 is integrated into a built-in/integral housing 1710 of a mobile phone 1700, with the housing 1700 encasing and protecting internal components of the phone. Beginning first with FIG. 17A, a rear/back perspective view is shown of the phone 1700. As may be appreciated from FIG. 17A, in addition to one or more cameras 1720 on the back of the phone 1700, the receiver 700 may also be disposed on the back of the phone 1700. The receiver 700 (and indeed the earphone 200 when engaged therewith) may be partially recessed into the housing 1710 even if not flush with it to leave the earphone 200 itself somewhat exposed for ergonomics (e.g., easy gripping). However, in other embodiments the receiver 700 may in fact be flush so that no portion thereof rises above the back surface of the phone 1700, and the earphone 200 itself might also be flush if, for example, a press-to-release embodiment is used to release the earphone 200 since this too provides beneficial ergonomics. Also note as shown in FIG. 17A that the earphone 200 has been secured to the phone 1700 via placement in the receiver 700, with the tab 710 and other components discussed above (e.g., magnets) helping to hold the earphone 200 in place even if the phone 1700 were slid into a purse, tight-fitting pants pocket, etc. FIG. 17B then shows a top plan view of the phone 1700 with housing 1710 and the earphone 200 engaged with the receiver 700, while FIG. 17C shows a bottom plan view of the phone 1700 with housing 1710 and the earphone 200 engaged with the receiver 700. The bottom of the phone 1700 might also include speakers 1730 and a charge port 1740 for connecting an AC charger as shown.

Figure 17D:
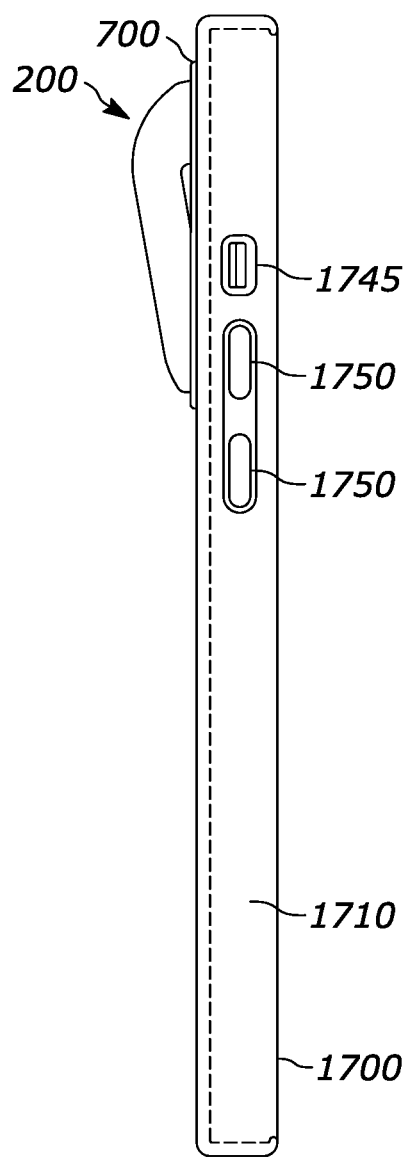
FIG. 17D shows a side elevational view of the mobile phone engaged with the earphone consistent with present principles.
Figure 17E:
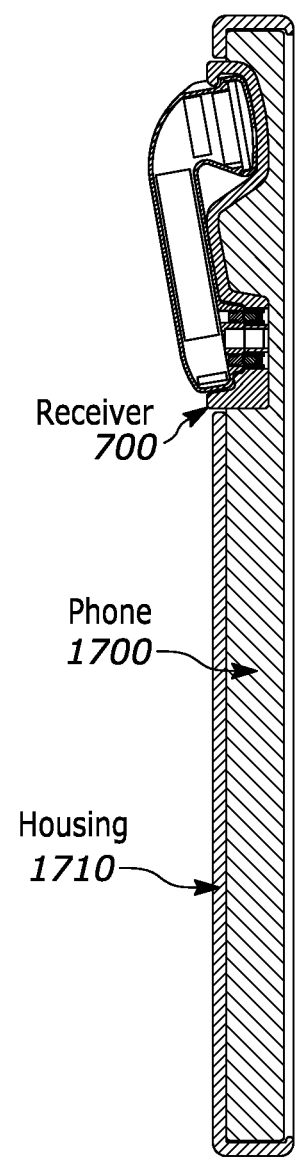
FIG. 17E shows a cross-sectional side view of the mobile phone engaged with the earphone consistent with present principles.

FIG. 17D then shows a side elevational view of the phone 1700 with housing 1710, with a ring/silent button 1745 and up/down volume buttons 1750 also shown. FIG. 17E is also a side view, but here the view is a side cross-sectional view. The cross-sectional view shows certain electrical contacts on the earphone 200 and housing 1710 engaged directly with each other rather than through intermediary electrical contacts in a detachable mobile phone case but either way will be discussed in greater detail in reference to the exploded view of FIG. 19 as will be described shortly.

Figure 18A:
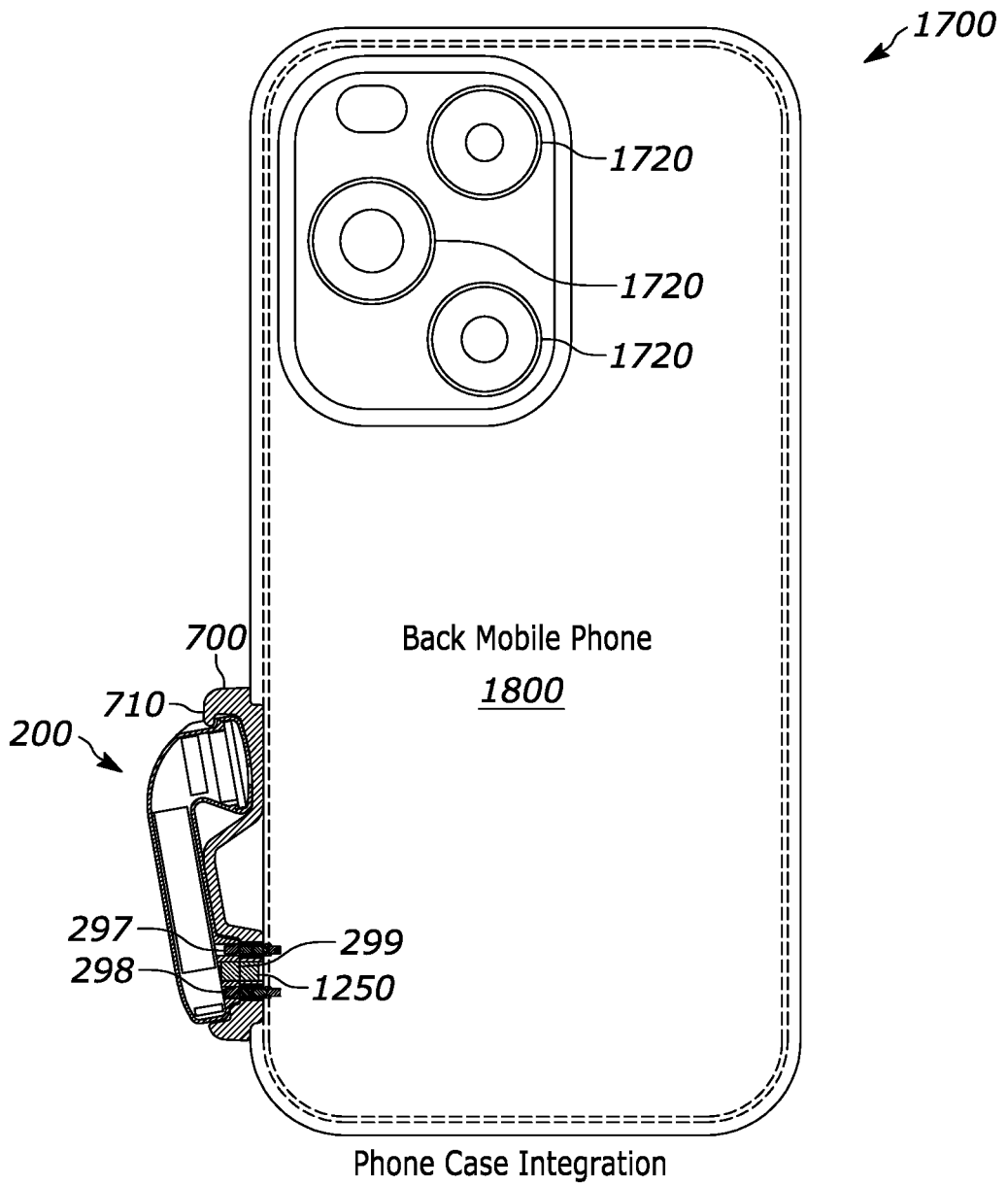
FIG. 18A shows a rear perspective view of a mobile phone case engaged with the earphone consistent with present principles.
Figure 18B:
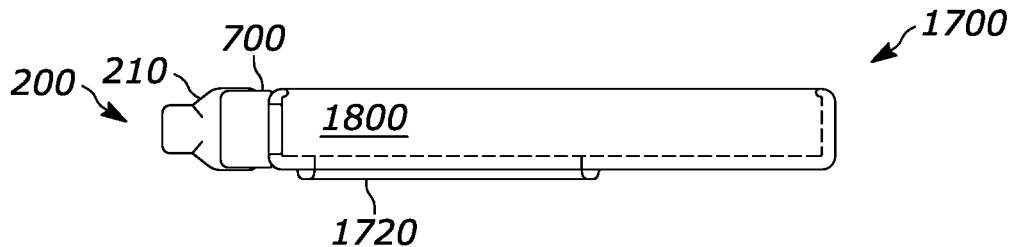
FIG. 18B shows a top plan view of the mobile phone case engaged with the earphone consistent with present principles.
Figure 18C:
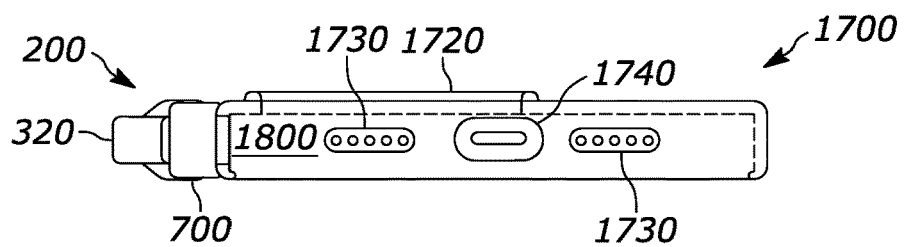
FIG. 18C shows a bottom plan view of the mobile phone case engaged with the earphone consistent with present principles.

However, first reference is made to FIGS. 18A-18E. These figures show an example where the receiver 700 is integrated into the aforementioned detachable mobile phone/device case 1800 that is detachable from the integral housing 1710 by hand without the aid of a tool and protects the built-in/integral housing 1710 itself. Beginning first with FIG. 18A, a rear/back perspective view is shown of the phone 1700 with case 1800. As may be appreciated from FIG. 18A, the receiver 700 may be disposed on a right side of the case 1800. The receiver 700 may not be partially recessed into the case 1800 in this example, though in other instances it may in fact be partially recessed or even sit flush with the exterior of the case 1800. Also note as shown in FIG. 18A that the earphone 200 has been secured to the phone 1700 via placement in the receiver 700, with the tab 710 and other components discussed above (e.g., magnets) helping to hold the earphone 200 in place even if the phone were slid into a purse, tight-fitting pants pocket, etc. FIG. 18B then shows a top plan view of the phone 1700 with case 1800 and the earphone 200 engaged with the receiver 700, while FIG. 18C shows a bottom plan view of the phone 1700 with case 1800 and the earphone 200 engaged with the receiver 700.

Figures 18D, 18E:
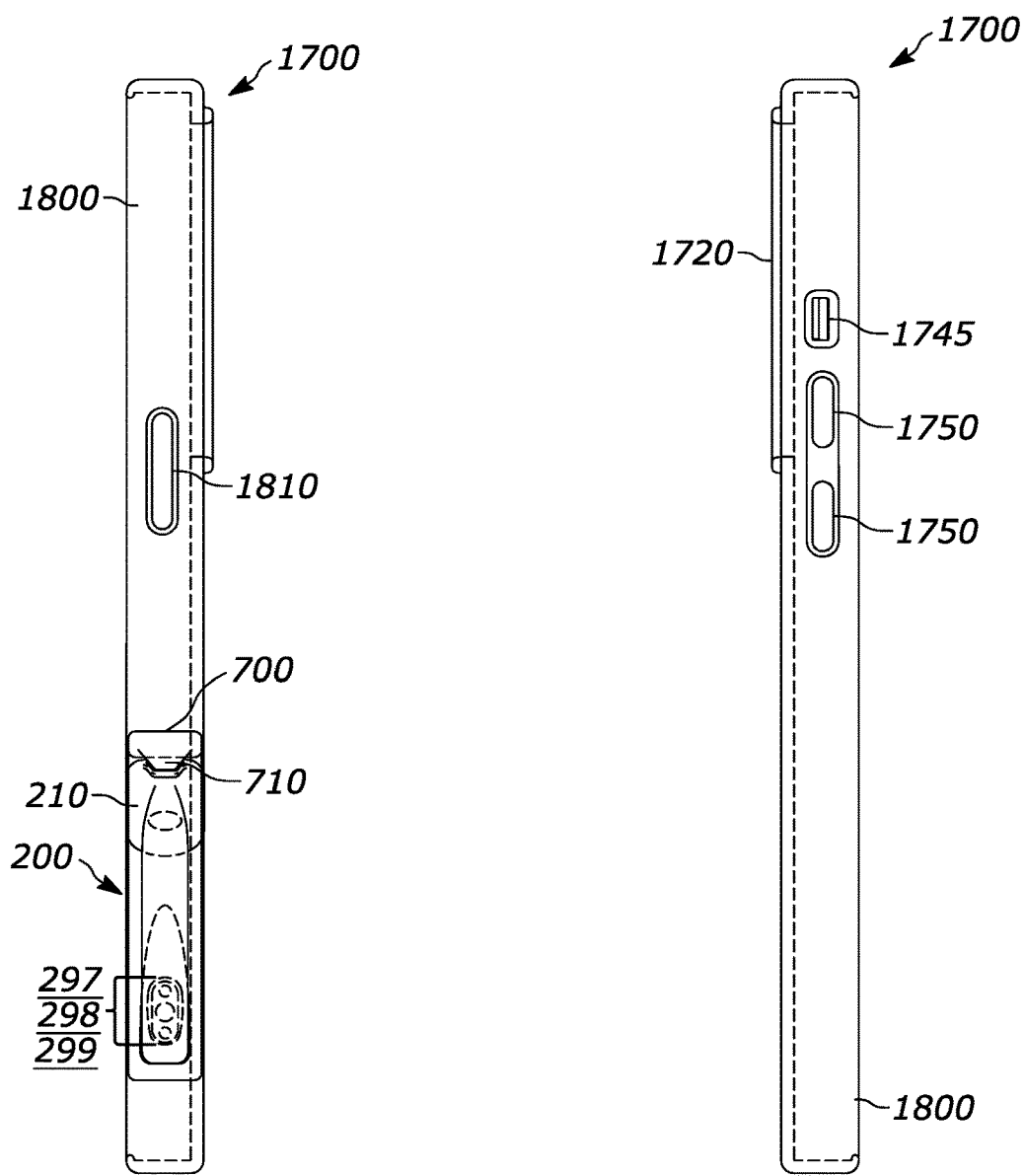
FIG. 18D shows a right side elevational view of the mobile phone case engaged with the earphone consistent with present principles.
FIG. 18E shows a left side elevational view of the mobile phone case engaged with the earphone consistent with present principles.

FIG. 18D shows a right side elevational view of the phone 1700 with case 1800, with a power button 1810 also being disposed on that side. FIG. 18D further shows that the right-side of the case 1800 (relative to the front of the phone 1700 and case 1800) may bear the earphone 200 and receiver 700. FIG. 18E then shows a left side elevational view of the phone 1700 with case 1800, with the left side again bearing the ring/silent button 1745 and up/down volume buttons 1750.

Referring briefly again to FIG. 18A, note that reciprocal neodymium magnets 299, 1250 respectively on the earphone 200 and receiver 700 as already described above are shown. Electrical contacts 297, 298 are also shown as physically contacting respective reciprocal contacts on the case 1800 itself to provide an electrical path to the circuitry within the phone 1700 itself as also described above. Additional aspects shown in this figure will now be discussed in greater detail in reference to the views of FIGS. 19 and 19A.

Accordingly, in reference to FIG. 19, an example partial rear/back perspective view is shown of the phone 1700 housed within the case 1800, with it being further understood that many of the components of FIG. 19 discussed below may also be included in the example embodiment of FIGS. 17A-E where the earphone 200 and receiver 700 are disposed on the back of the phone/integral housing 1710 itself rather than on the side of the case housing 1800.

In any case, as shown in FIG. 19, the earphone 200 may include communication and charging circuitry 1900 as referenced above. The earphone 200 may also include a speaker driver magnet 1920 and metallic support structure that may pull toward a fixed magnet mounted on the receiver 700 within the inlet 720 for helping to secure the earphone 200 within the receiver 700 in certain example embodiments. Additionally, the earphone 200 may include a wireless transceiver 1925 that is configured to wirelessly communicate with another wireless transceiver on the mobile phone 1700 to facilitate telephone calls and other functions. The wireless transceivers may be Bluetooth transceivers, Wi-Fi transceivers, NFC transceivers, etc. Also shown on the earphone 200 is a battery 1930 that powers the circuitry of the earphone 200, as well as the microphone 293 already described above. FIG. 19 further shows other components that are also shown close up in the exploded view of FIG. 19A.

Accordingly, reference is now made to FIG. 19A. Note that the neodymium or other rare earth magnets 299, 1250 are again shown pulling the earphone 200 toward the receiver 700, and then when contact is made the earphone 200 is secured both mechanically and magnetically to the receiver 700. And note again that for earphone removal to make and answer calls, the user may grasp the earphone 200 on the stem 290 near the stem middle and rotate the stem 290 away from the receiver 700 as described above to overcome the magnetic attraction/connection.

The exploded view of FIG. 19A also shows the fixed electrical/data contacts 297, 298 described above, which may respectively contact reciprocal electrical/data contacts 1940, 1950 disposed within the inlet 1110 of the receiver 700. As also shown in FIG. 19A, the contacts 1940, 1950 within the integrated receiver 700/case 1800 may be wired to and/or configured to engage/contact additional electrical/data contacts 1960, 1970 within the receiver 700/case 1800.

The contacts 1960, 1970 may therefore be in electrical communication respectively with the contacts 1940, 1950. Thus, dual opposing electrical contacts are established for the contact pair 1940, 1960 and contact pair 1950, 1970 to transfer data and/or power, with it being reiterated for clarity that any of the contacts described herein may be used for transferring both data and power to reciprocal contacts.

The exploded view of FIG. 19A also shows that fixed electrical/data contacts 1980 and 1990 may be mounted within the built-in integral housing 1710 and thus be wiredly connected to other internal circuitry within the phone 1700, such as the phone's CPU and/or other processor(s) as well as the phone's charging circuit. The contacts 1980 and 1990 may 1990 may respectively contact the contacts 1960, 1970 when the phone 1700 is secured within the case 1800 to transfer data and power therebetween.

Additionally, note that the contacts 1960, 1970, 1980, and 1990 may be spring-loaded, as may any of the other electrical contacts discussed herein in certain non-limiting examples. The springs that are used may be stamping integrated wave springs, coil/compression springs, and/or single-anchored lever springs. A spring may therefore be employed for a given electrical contact so that the contact moves transversely inward into its respective housing based on pressure from a reciprocal contact (and outward out of its respective housing when disengaged from another contact), helping to ensure adequate contact to transfer power and data. Example springs 1995 are therefore shown in FIG. 19A for the contact pair 1940, 1960 and pair 1950, 1970.

Figure 20:
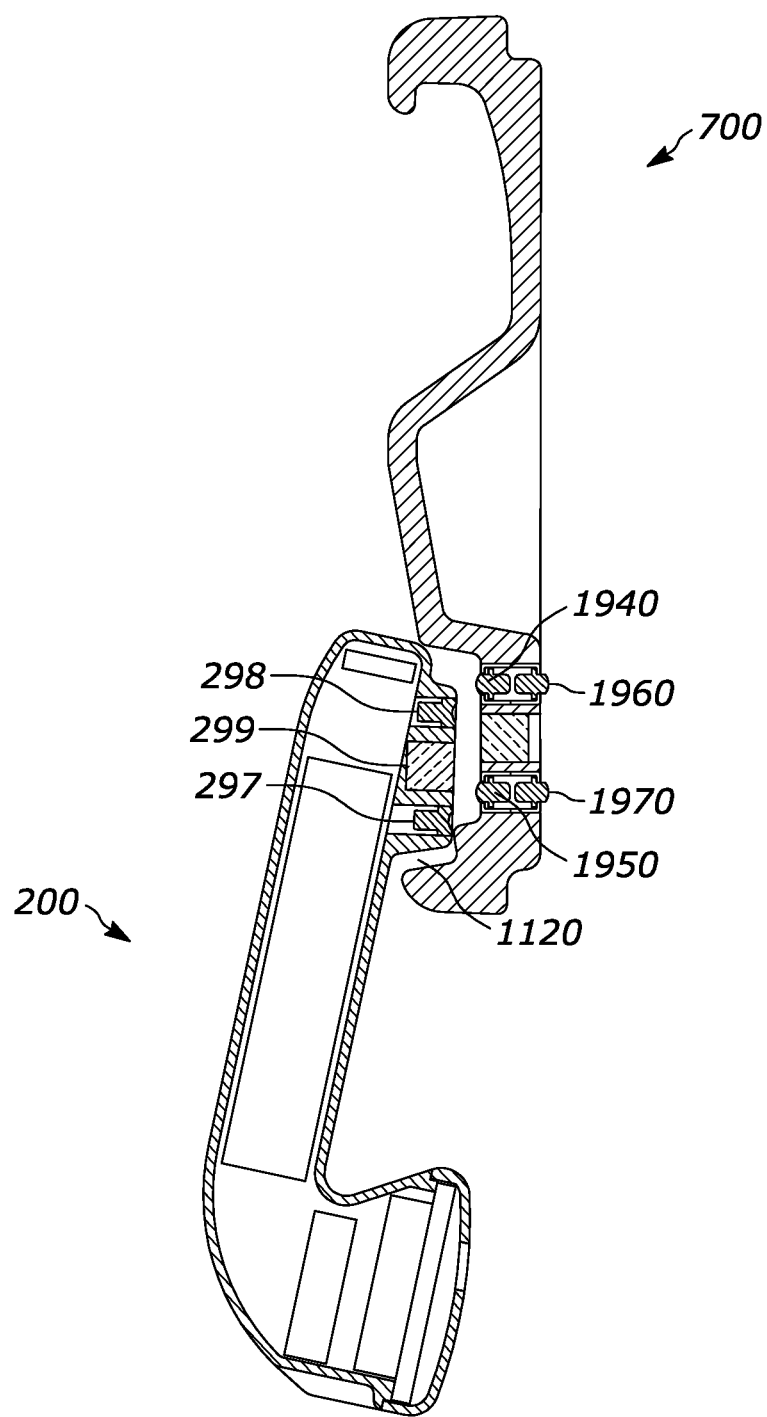
FIG. 20 shows a side elevational view of the earphone and receiver to illustrate a connection reversal study where a short circuit is prevented consistent with present principles.

Before moving on to FIG. 20, note that if the exploded view of FIG. 19A were showing another embodiment where the receiver 700 was integrated with the built-in integral housing 1710 of the phone 1700 instead of the phone case embodiment shown, the contacts 1940-1970 may be omitted and the contacts 297, 298 may be both fixed/non-sprung and configured for direct contact with the contacts 1980, 1990 as also fixed within the housing 1710 to still provide an electrical and data path between the internal circuitry of the earphone 200 and mobile phone 1700. Thus, note that while the contacts 1980 and 1990 could be spring-loaded in the integral housing embodiment, eliminating the variability introduced by an intervening phone case may allow the relevant reciprocal contacts to be fixed, non-sprung.

Also note that data signals for detection of earphone 200 presence and removal can be included within the charging current that is transferred between contacts. Thus, for example, while data is exchanged/exchangeable through reciprocal contacts the earphone 200 may be determined to be present in the receiver 700, and when data is not exchangeable through the reciprocal contacts the earphone 200 may be determined to be removed from the receiver 700. Accordingly, while in one example embodiment presence/removal detection may be passed to the CPU or other processor of the device 1700 via its own internal charging circuitry/BMS/BMU without data in the charging power stream itself, in other example embodiments data may be sent simultaneously/concurrently with charging current. However, in the former embodiment the passing of data for presence/removal detection may be omitted in favor of the phone's BMS simply sensing the presence/removal of the earphone 200 without data passing between the contacts (e.g., with current and breaks in current being sensed using a resistive shunt sensor and/or a Hall-effect sensor in the BMS).

Continuing the detailed description in reference to FIG. 20, a side elevational view of the earphone 200 and receiver 700 are shown to illustrate a connection reversal study. FIG. 20 illustrates that should the end-user improperly place the earphone 200 in contact with the receiver 700 upside down, the contacts 297, 298 will not contact other contacts than their reciprocal ones on the receiver 700 that they are already configured to contact (contacts 1940 and 1950, respectively) owing to the geometry of the hardware protrusion 1120 itself. Instead, at best the contacts 297, 298 may abut other non-electrical portions of the receiver 700 or not touch any part of the receiver 700 at all. Thus, reversing the earphone 200 will not permit a short circuit due to the shapes of the receiver 700 and earphone 200. However, further note that in one preferred non-limiting example embodiment the BMU may omit or prevent power from being supplied to the charging contacts of the receiver 700 itself while the earphone 200 is removed, as triggered by the BMS sensing removal of the earpiece 200.

Figure 21:
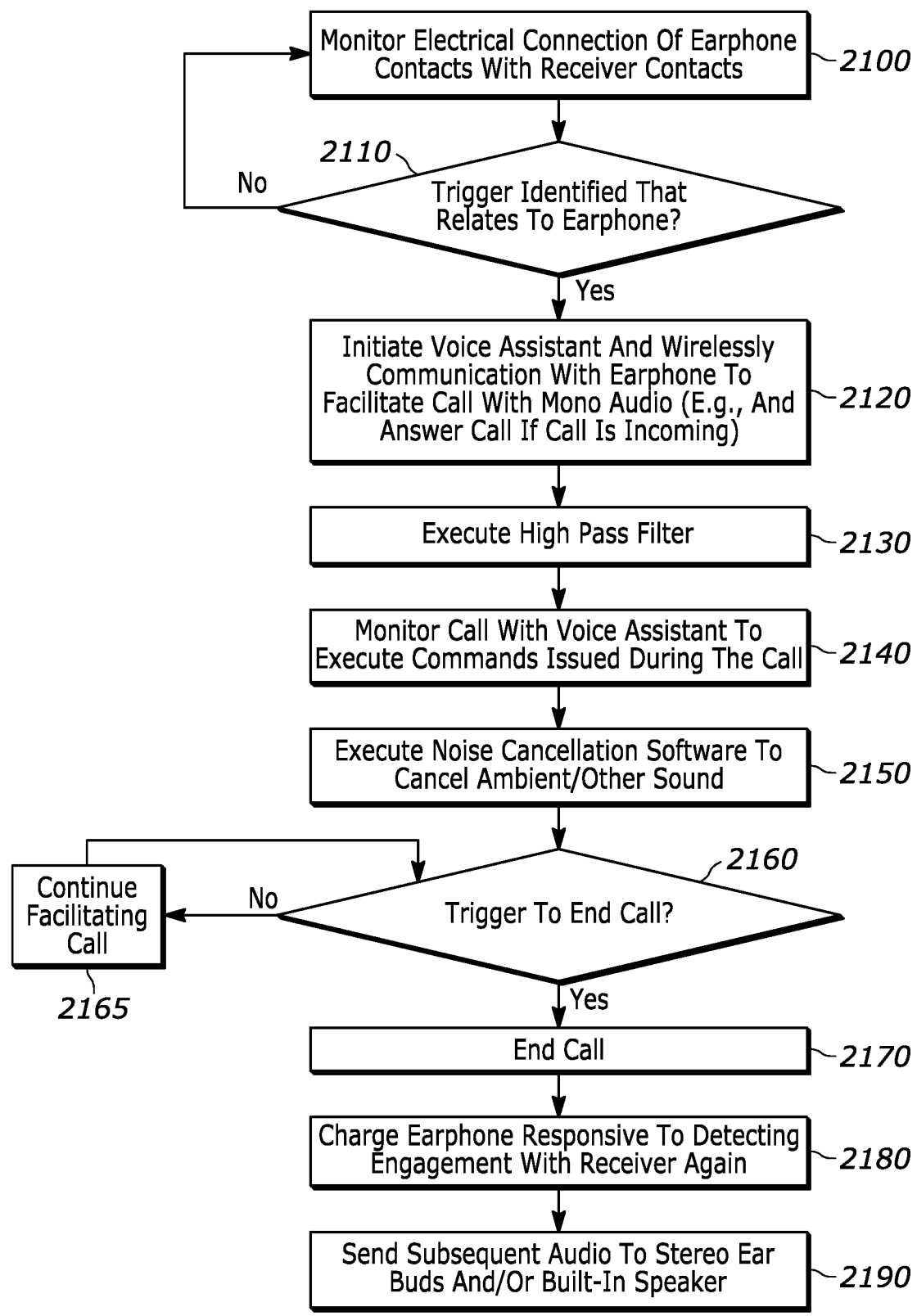
FIG. 21 shows example logic in example flow chart format that may be executed by a device such as the mobile phone consistent with present principles.

Now in reference to FIG. 21, it shows example logic that may be executed by a device such as the mobile phone 1700 consistent with present principles. However, further note that some or all of the logic may be executed by the earphone 200 and/or a remotely-located server in any appropriate combination consistent with present principles. Further note that while the logic of FIG. 21 is shown in flow chart format, other suitable logic may also be used.

Beginning at block 2100, the device may monitor the electrical connection of the earphone 200 with the receiver 700 via contacts as discussed above. This may be done using the device's CPU, the device's charging circuitry, and/or other electrical circuitry as discussed herein.

From block 2100 the logic may then proceed to decision diamond 2110. At diamond 2110 the device may monitor for one or more triggers and determine whether one or more of the triggers have in fact been identified. In one example, the trigger may include a threshold non-zero period of time elapsing from detachment of the earphone 200 from the receiver 700 during call reception for an incoming call, where the threshold period of time may be an amount of time adequate for the user to remove the earphone 200 from the receiver 700 and place it in their ear without missing any audio from the incoming call that might otherwise be presented during that transition period. As such, the threshold period of time may be two seconds in non-limiting examples.

Additionally or alternatively, the trigger may include receipt of one or more wireless signals from the earphone 200 that indicate that the earphone 200 has been engaged with an ear of the end-user. For example, the earphone's processor may receive input a touch sensor that may establish the sensor 280 described above, and then generate one or more wireless signals indicating touch contact (and hence engagement of the earphone 200 with the user's ear) based input from the touch sensor and send those wireless signals to the mobile phone executing the present logic. The touch sensor may be capacitive or resistive, for example. Further note that in addition to or in lieu of the capacitive or resistive touch sensor, an IR sensor and/or temperature sensor may also be used to sense engagement of the user's ear with the earphone 200, as may other suitable types of sensors.

Additionally or alternatively, the one or more wireless signals may be generated based on audible vocal input received at the earphone's microphone 293 and wirelessly transmitted from the earphone 200 to the phone 1700, which may also indicate engagement of the earphone 200 with the user's ear so that the user can use it to participate in a telephone call (e.g., initiate or answer a call). The wireless signals received at the phone 1700 may thus include signals that stream input from the microphone 293 so that the phone 1700 may then identify human speech frequencies indicated by the signals, or even execute speech recognition software using the input to determine whether the input itself indicates audible vocal input (spoken words) as opposed to other non-vocal sounds. Regarding identifying human speech frequencies possibly without execution of speech recognition software, it is recognized herein that human speech generally occurs in the range of 85 Hz to 300 Hz in non-limiting examples and even 85 Hz to 255 Hz in particular non-limiting examples. As such, the trigger may be removal of the earphone 200 from the receiver 700 and identification of one or more human speech frequencies as sensed by the microphone 293 that fall within those ranges (as indicated via the received wireless signals), which indicates that the earphone 200 has been engaged with the ear and is proximate enough to sense sound in that frequency range. In certain non-limiting examples, the sensed audio may also be required to be above a threshold volume/amplitude to help eliminate false positives for ambient audio, audio from the jostling or manipulation of the earphone 200 during removal from the receiver 700 and placement in the ear, and audio of the voice of the user and other people that might not be intended as input (e.g., received while the earphone 200 might be removed from the receiver 700 but still not yet engaged with the user's ear).

As such, the threshold amplitude may be in the range of 50 to 60 decibels (dB) in non-limiting examples as may be set by a system administrator, device manufacturer, etc. And again, note that using identification of audio in the frequency range of 85 Hz to 300 Hz that might also be above the threshold amplitude may be used not just as a trigger for answering incoming telephone calls (beginning/transceiving audio for the telephone call responsive to identification of such), but also for making an outbound call where, for example, the user might have already pressed a button or otherwise initiated the telephone call from the phone 1700 itself but has not yet placed the earphone 200 in their ear so that even if the manual button press or other command has been provided the device will not actually initiate the call until audio in this frequency range and above the threshold amplitude is detected. What's more, note that this frequency range and threshold amplitude may be used as a trigger in examples where the earphone 200 has already been placed in the user's ear before a call is even made or received (e.g., as sensed using a capacitive touch sensor). The trigger of recognition of audile vocal speech itself may be similarly used if the earphone 200 is already in the user's ear.

Furthermore, in one non-limiting example, a trigger consistent with present principles may also specifically include an audible command received via the microphone 293 to initiate a call, as also identified via speech recognition and a voice/digital assistant already being executed by the device/phone (or that is launched and executed responsive to detection of removal of the earphone 200 from the receiver 700). The voice assistant may use natural language understanding (NLU) for processing the voice input and may be established by Apple's Siri, Google's Assistant, or Amazon's Alexa, for example.

As yet another example, a trigger may include identification of audible input indicating a vocal greeting such as "hello" or "hey", as may also be identified using speech recognition and/or the digital assistant with NLU capability. The greeting itself may be identified as such using NLU, and/or by matching the greeting to an entry in a database or data table that indicates greetings which are to be recognized as the trigger. The database or data table itself may be configured by the device's manufacturer, a system administrator, an end-user, etc. Furthermore, note that in one specific example the vocal greeting may be identified and placed in a buffer maintained in RAM of the device so that once the call connection to the other device(s) is actually established based on the trigger, the greeting as already spoken may be sent from the buffer to the other device on the other end of the call so that the user that spoke the greeting does not have to repeat themselves, which can otherwise be frustrating and/or lead to disjointed conferencing and possibly silence on both ends of the call.

In addition to or in lieu of the foregoing triggers, further note that the device sensing removal of the earphone 200 itself from the receiver 700 (e.g., based on a break between electrical contacts as discussed above) may itself be used as the trigger at diamond 2110, if desired (e.g., without a threshold time delay as discussed above).

Still in reference to decision diamond 2110, note that a negative determination may cause the logic to revert back to block 2100 and proceed again therefrom. However, responsive to an affirmative determination at diamond 2110, the logic may instead proceed to block 2120. At block 2120 the device may responsive to identifying the trigger(s), initiate or launch a voice/digital assistant if it has not already done so according to the disclosure above. Also at block 2120 responsive to identifying the trigger(s), the device may wirelessly communicate with the earphone itself via Bluetooth or other wireless signals to facilitate the call (e.g., a cellular audio telephone call, a video conference call, etc.). Again note that the device may present audio from the call as mono audio rather than stereo audio, as only the single earphone 200 would be used. And further note for clarity that if the call is an incoming call, at block 2120 the device may answer the call responsive to the trigger (e.g., responsive to the two-second threshold period of time referenced above elapsing).

From block 2120 the logic may proceed to block 2130. At block 2130 the device may execute a high pass filter to filter audio below a threshold frequency. This may be done based on the recognition that certain bass frequencies may not be adequately presented via the speaker in the earphone anyway as already discussed above, and accordingly those frequencies may be filtered out to avoid further processing of those frequencies. This in turn may minimize processor constraints and save power. As such, the threshold frequency may be 80 Hz in non-limiting examples such that frequencies below 80 Hz are filtered out by the high pass filter. 80 Hz may be used in non-limiting examples to provide a buffer between the 80 Hz threshold itself and the general 85 Hz lower end for human voice to help avoid unintentionally filtering out low-frequency voice input occupying space around 85 Hz.

From block 2130 the logic may then proceed to block 2140. At block 2140 the device may monitor the currently-transpiring call itself by passing audio from the call to the digital assistant which in turn may respond to commands and requests for information provided to it during the call. The digital assistant may do so with or without first requiring a wake-up phrase such as "hey assistant". Thereafter, the logic may proceed to block 2150.

At block 2150 the device may if desired execute noise cancellation software to cancel ambient sound and/or other sound that is not part of the call audio itself. The device may therefore generate anti-waves to present via the earphone's speaker for noise cancellation and/or for streaming to the other device(s) on the other end(s) of the call. The device may do so using input from the microphone 293, input from another microphone on the earphone 200 that is dedicated to noise cancellation, or even input from the built-in microphone on the paired mobile phone itself.

From block 2150 the logic may proceed to decision diamond 2160. At diamond 2160 the device may monitor for triggers to end the call and thus determine whether such a trigger has in fact been identified. In one example, the trigger may be a voice command to the digital assistant to end the telephone call. As another example, identification of selection of an end button on the call management screen graphical user interface (GUI) as presented on the mobile phone's own electronic display may be used as the trigger to terminate the call.

Additionally or alternatively, the trigger to end the call may be the device sensing mechanical and/or magnetic engagement of the earphone 200 with the mobile phone 1700 again, and/or engagement of the earphone 200 with the mobile phone's charging circuit again (e.g., where the user physically hangs up the earphone 200 in the receiver 700). Accordingly, here the end call trigger may be detected a number of different ways, such as via a wireless charger on the phone 1700 sensing presence of the wireless charge receiver on the earphone 200 again (and/or being able to charge the receiver on the earphone 200 again). The end call trigger may also be detected via the reciprocal contacts of the earphone 200 and phone 1700 discussed above, where the contacts may remain hot while the two components are separated so that the phone's BMS measuring voltage from the battery in the earphone 200 again may be used as the trigger (e.g., as may occur once the earphone 200 is electrically reengaged with the phone 1700 via the contacts). Also in addition to or in lieu of the foregoing, a reed switch in the circuitry of the phone 1700 may be used to monitor for the presence of one or more of the magnets within the earphone 200 again to thus detect the hanging up of the earphone 200 based on the reed switch sensing the presence of the magnet(s) themselves (it being further noted that the reed switch may also be used for detecting removal of the earphone 200 as well based on sensing removal of the magnet(s)). Still further and also in addition to or in lieu of the foregoing, wireless communication (e.g., Wi-Fi or Bluetooth) between the phone 1700 and earphone 200 may be used while the two components are separated so that the two components may coordinate opening up the earphone 200 contacts at regular intervals of time for probing by the phone's BMU via its BMS sensors to determine physical reengagement. Thus, in one specific example embodiment the phone 1700 may attempt to send current/electrical pulses to the earphone 200 at regular intervals responsive to determining that the phone 1700 and earphone 200 are within a threshold distance of each other that is indicative of imminent potential reengagement. As such, the threshold distance may be two inches, and the current real-time distance by which the two components are separated may be determined based on execution of a received signal strength indication (RSSI) algorithm.

Responsive to a negative determination at diamond 2160, the logic may proceed to block 2165 where the device may continue facilitating the call, executing the high pass filter, performing noise cancellation, and executing commands provided during the call using the digital assistant, and then proceed back to decision diamond 2160 again. Then once an affirmative determination is made at diamond 2160 the logic may proceed to block 2170 where the device may end the call by disconnecting the call via the cellular telephone network that is being used, ending the data/Internet connection that is being used, or otherwise terminating the call.

From block 2170 the logic may then proceed to block 2180 where, if desired and responsive to detecting physical engagement of the earphone 200 with the receiver 700 again, the device may initiate charging of the battery 1930 within the earphone 200 via wireless charging and/or the electrical contacts as mentioned above.

Also if desired, the logic may then proceed to block 2190 where, also responsive to detecting physical engagement of the earphone 200 with the receiver 700 again, the device may control its audio processing circuitry to send subsequent audio that might be requested by the user and provided through the phone 1700 to separate stereo headphones that are already connected to the phone 1700, separate ear buds already that are connected to the phone 1700, and/or to the built-in speaker(s) internal to the phone 1700 itself. Also note that audio including that for an incoming or outgoing telephone call may be sent to the stereo speakers themselves responsive to connection of the stereo speakers while the earphone 200 remains within the receiver 700 (e.g., send the audio to stereo ear buds that are connected while a call is being received but before it is answered, and/or if the call is already ongoing).

Note that in addition to or in lieu of the configurations discussed above regarding securing the earphone 200 to a housing of a mobile phone or other device (e.g., using tabs, interference fits, magnets, etc.), the earphone 200 may also be secured to the device's housing(s) using a snap fit and/or a push button-type spring-loaded press-in-to-release latch (or other equivalent mechanism), where the earphone 200 itself acts as the "button" to be pressed inward toward the housing to release it and then later to reengage it.

Figure 22:
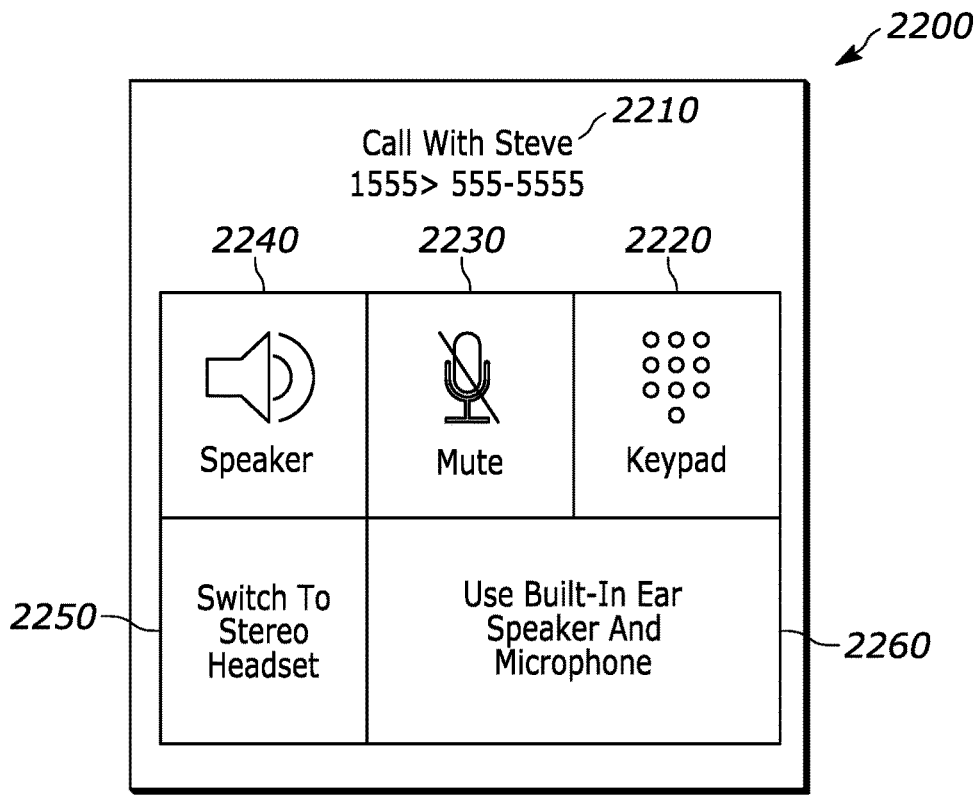
FIG. 22 shows an example call management screen graphical user interface (GUI) that may be presented on a display of the mobile phone during a call consistent with present principles.

Continuing the detailed description in reference to FIG. 22, an example call management screen GUI 2200 is shown that may be presented during a call on the display of the mobile phone 1700 or other type of device bearing the receiver 700. Note here that the selectors discussed below may be selected by directing touch, cursor, or other input to the selector itself.

As shown in FIG. 22, the GUI 2200 includes an indication 2210 of the person on the other end of the call as well as the telephone number of that person. The GUI 2200 may also include a selector 2220 that may be selectable to command the device to present a numerical keypad in addition to or in lieu of the GUI 2200, as well as a selector 2230 that is selectable to mute outbound audio from the phone 1700 from being provided to the other device as part of the call.

As also shown in FIG. 22, the GUI 2200 may include a speaker phone selector 2240. The selector 2240 may be selectable to use speakerphone functionality where audio from the user is detected by the built-in microphone on the device 1700 (rather than the microphone 293) and call audio is presented audibly via a built-in speaker on the device 1700. Thus, note that the user may switch from using the earphone 200 to using the speakerphone functionality by selecting the selector 2240 during the call and then hang up the earphone 200 in the receiver 700 during the call without ending the call itself.

As also shown in FIG. 22, the GUI 2200 may include a selector 2250. The selector 2250 may be selectable to command the phone 1700 to switch from using the earphone 200 to using a separate headset with separate microphone and stereo earphones. This too may occur during the call and then the user may hang up the earphone 200 in the receiver 700 during the call without ending the call itself.

FIG. 22 further shows that the GUI 2200 may include a selector 2260. The selector 2260 may be selectable to switch to using the built-in ear speaker on the phone 1700 (e.g., different from the speakerphone speaker that loudly projects sound) as well as the aforementioned built-in microphone of the mobile phone for the call. Yet again, this may occur during the call and then the user may hang up the earphone 200 in the receiver 700 during the call without ending the call itself.

Figure 23:
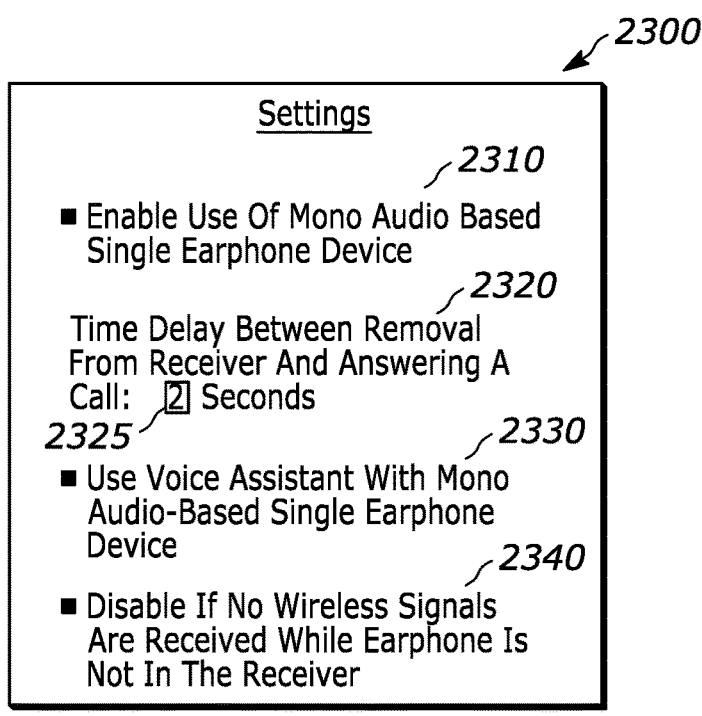
FIG. 23 shows an example settings GUI that may be presented on the display of the mobile phone to configure one or more settings of the mobile phone to operate consistent with present principles.

Now in reference to FIG. 23, it shows an example settings GUI 2300 that may be presented on a display of a device such as the phone 1700 to configure one or more settings of the device to operate consistent with present principles. For example, the GUI 2300 may be presented by navigating a device, call, or app menu at a client device that is being or will be used for a call in conjunction with the earphone 200. Also note that in the example shown, each option discussed below may be selected by directing touch or cursor or other input to the respective check box adjacent to the respective option.

As shown in FIG. 23, the GUI 2300 may include an option 2310 that may be selectable a single time to set or enable the device to, for multiple future calls, use the mono audio-based earphone 200. For example, selection of the option 2310 may set or configure the device to undertake the logic of FIG. 21 and/or execute other actions in relation to the earphone 200 as discussed above.

The GUI 2300 may also include a setting 2320 at which the threshold period of time may be set that is to elapse from detachment of the earphone 200 from the other device during call reception. Accordingly, numerical input may be directed to input box 2325 using a hard or soft keyboard to establish the threshold period of time. In the present example, the threshold period of time has been set by the end-user to two seconds for reasons set forth above.

Additionally, the GUI 2300 may include an option 2330 that may be selectable to configure the device to specifically trigger and use a voice assistant during a call facilitated using the earphone 200, and to even use the voice assistant based on audible commands provided to the microphone 293 on the earphone 200 even if no call is ongoing.

As also shown in FIG. 23, the GUI 2300 may include an option 2340. The option 2340 may be selectable to set or configure the device to disable use of the earphone 200 (e.g., not attempt to send call audio to it or use it for one or more triggers as set forth above) when no wireless signals are received from the earphone 200 while also not engaged with the receiver 700. This may be useful should the earphone 200 be lost or temporarily out of signal range so that the other device does not attempt to still use the earphone 200 for a call when the user tries to answer or place a call using the other device itself (e.g., phone 1700). But once the earphone 200 comes back within signal range, the other device may continue using it consistent with the disclosure above (e.g., assuming the option 2310 itself remains selected). Additionally, further note with respect to the option 2340 that the option 2340 or another selector that is selectable for the same functionality may also be included on the call management GUI 2200 of FIG. 22 itself to disable use of the earphone 200 when lost or otherwise in disuse.

Before concluding, it is to be understood that although a software application for undertaking present principles may be vended with a device such as the phone 1700, present principles apply in instances where such an application is downloaded from a server to a device over a network such as the Internet. Furthermore, present principles apply in instances where such an application is included on a computer readable storage medium that is vended and/or provided by itself, where the computer readable storage medium is not a transitory signal and/or a signal per se.

It may now be appreciated that present principles provide for improved computer-based user interfaces that increase the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein.

What is claimed is:

1. An earphone assembly for a mobile phone, the earphone assembly comprising an earphone, the earphone comprising:
    a head configured for engaging an ear, the head comprising at least one speaker, the head comprising a flat front surface facing toward an ear canal when worn, the flat front surface being bounded by three straight sides and a curved bottom edge; and
    an elongated stem comprising a first end engaged with a rear portion of the head opposite the flat front surface and comprising a second end opposite the first end, the stem depending down from the head when worn, at least one microphone disposed on the stem adjacent the second end, the stem being graspable with thumb, fore, and middle fingers for ergonomic gripping;
    wherein the earphone assembly further comprises the mobile phone, the mobile phone programmed with instructions to:
    responsive to a trigger, answer an incoming call and wirelessly communicate with the earphone to present audio from the incoming call via the at least one speaker, wherein the trigger comprises receipt of one or more wireless signals from the earphone that are generated based on audible vocal input received at the at least one microphone.

2. The earphone assembly of claim 1, comprising:
    at least one magnet adjacent the second end to magnetically couple the earphone to the mobile phone.

3. The earphone assembly of claim 1, comprising:
    at least one electrical connector adjacent the second end to electrically engage the earphone with the mobile phone.

4. The earphone assembly of claim 1, wherein the trigger comprises a threshold period of time elapsing from detachment of the earphone from the mobile phone during call reception.

5. The earphone assembly of claim 1, wherein the instructions are executable to:
    terminate the incoming call responsive to mechanical or magnetic engagement of the earphone with the mobile phone.

6. The earphone assembly of claim 1, comprising a housing for the mobile phone, the housing configured to couple the earphone to the mobile phone, the housing comprising one or more of: an integral housing, a detachable mobile phone case, wherein the detachable mobile phone case is detachable from the mobile phone by hand without the aid of a tool.

7. The earphone assembly of claim 1, comprising a first wireless transceiver on the earphone and comprising a second wireless transceiver on the mobile phone, the first wireless transceiver configured to wirelessly communicate with the second wireless transceiver to facilitate telephone calls.

8. An assembly, comprising:

an earphone, the earphone comprising:

a head, the head comprising at least one speaker, the head comprising a front surface, the front surface being bounded by three sides and a curved bottom edge, the curved bottom edge configured for placement on top of an incisura of an ear to hang on the incisura;

the assembly further comprising:

at least one computer readable storage medium (CRSM) that is not a transitory signal, the at least one CRSM comprising instructions executable by a processor to:

identify, at a mobile device, a trigger related to the earphone, the trigger comprising a threshold period of time elapsing from detachment of the earphone from the mobile device during call reception; and responsive to identification of the trigger, facilitate a call and present mono audio from the call via the at least one speaker on the earphone.

9. The assembly of claim 8, wherein the earphone comprises:

an elongated stem comprising a first end engaged with a rear portion of the head opposite the front surface and comprising a second end opposite the first end, the stem depending down from the head when worn, the stem comprising at least one microphone disposed on the stem adjacent the second end, the stem being graspable with thumb, fore, and middle fingers for ergonomic gripping.

10. The assembly of claim 8, comprising the processor.

11. The assembly of claim 8, wherein the trigger comprises receipt of one or more wireless signals from the earphone that are generated based on audible vocal input received at a microphone on the earphone.

12. A method, comprising:

providing an earphone assembly for a mobile phone, the earphone assembly comprising an earphone, the earphone comprising:

a head configured for engaging an ear, the head comprising at least one speaker, the head comprising a front surface facing toward an ear canal when worn, the front surface being bounded by three sides and a curved bottom edge; and an elongated stem comprising a first end engaged with a rear portion of the head and comprising a second end opposite the first end, the stem depending down from the head when worn, the stem comprising at least one microphone disposed on the stem adjacent the second end, the stem being graspable with thumb, fore, and middle fingers; and providing the mobile phone, the mobile phone programmed with instructions to:

responsive to a trigger, answer an incoming call and wirelessly communicate with the earphone to present audio from the incoming call via the at least one speaker, wherein the trigger comprises receipt of one or more wireless signals from the earphone that are generated based on audible vocal input received at the at least one microphone.

13. The method of claim 12, wherein the instructions are executable to:

terminate the incoming call responsive to mechanical engagement of the earphone with the mobile phone.

14. The method of claim 12, wherein the instructions are executable to:

terminate the incoming call responsive to magnetic engagement of the earphone with the mobile phone.

15. The method of claim 12, wherein the trigger comprises a threshold period of time elapsing from detachment of the earphone from the mobile phone during call reception.

\* \* \* \* \*